(12) United States Patent
Noda

(10) Patent No.: US 7,446,955 B1
(45) Date of Patent: Nov. 4, 2008

(54) WIDE-ANGLE LENS SYSTEM

(75) Inventor: Sayuri Noda, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 11/845,083

(22) Filed: Aug. 26, 2007

(51) Int. Cl.
*G02B 9/34* (2006.01)
*G02B 3/02* (2006.01)

(52) U.S. Cl. ........................... 359/781; 359/715

(58) Field of Classification Search ............... 359/781, 359/770, 762, 708, 715, 753
See application file for complete search history.

(56) References Cited

U.S. PATENT DOCUMENTS 5,680,259 A * 10/1997 Yamada .................. 359/753

\* cited by examiner

*Primary Examiner*—William C Choi
*Assistant Examiner*—Jack Dinh
(74) *Attorney, Agent, or Firm*—Banger Shia

(57) ABSTRACT

A wide-angle lens system comprises, sequentially from the object side to the image side: a first lens element, a second lens element, a third lens element, an aperture and a fourth lens element. If the field of view of the wide-angle lens system is as high as 140 degrees, the extreme distortion of the image edge can be prevented with only four lens elements, and the image has a high sharpness. Therefore, it is very suitable for use in the monitor and vehicle-related lens system.

6 Claims, 28 Drawing Sheets

WIDE-ANGLE LENS SYSTEM

BACKGROUND OF THE INVENTION

1. Field of the Invention

The present invention relates to a wide-angle lens system comprising a first lens element, a second lens element, a third lens element, an aperture stop, and a fourth lens element, and more particularly to a super wide-angle lens system which is suitable for use in monitor or vehicle, and whose field of view is as high as 140 degrees.

2. Description of the Prior Art

The biggest problem in designing a conventional wide-angle lens system is that the problem of image distortion will occur after the object image is processed by the lens system. However, in the past, only the spherical glass lens can be manufactured and in order to compensate the negative distortion aberration (also called barrel distortion, namely, image magnification decreases with increasing distance from the optical axis, and the straight lines are curved in image), a plurality of negative and positive meniscus lens elements should be arranged at the front end of the lens system. When the field of view of the lens system is 80 degrees, it needs 8-10 lens elements, and if the field of view is more than 100 degrees, it needs 10-12 lens elements, and this will increase the length and weight of the lens system.

Due to advances in plastic optical material manufacturing and popularity of manufacturing technology of the aspheric lens element, many miniaturized and lightweight lens systems came into existence. Particularly, after using the aspheric lens element, the lens system only needs 3-4 lens elements when the field of view is 80 degrees, and it only needs 4-5 lens elements when the field of view is over 120 degrees. Obviously, lens system is developing towards miniaturization and lightweight.

Furthermore, the number of lens elements of the super wide-angle lens system disclosed in JP Patent Publication No 2003-307674, the wide-angle lens system disclosed in JP Patent Publication No 2005-227426, the wide-angle lens system disclosed in JP Patent Publication No 2006-146016, the wide-angle lens system and device for taking image as disclosed in JP Patent Publication No 2006-292988, and the optical device disclosed in JP Patent Publication No 2007-025499, has been reduced to 4-5 pieces. Therefore, there is no doubt that these lens systems are miniaturized and lightweight.

However, these lens systems still have the problem of image distortion. For a general lens system, the image distortion is usually compensated based on the protection equation: y'=f·tan ω, y is the image height, f represents focal length, and ω represents half field of view. There are also other projection methods, such as: stereographic projection y'=2f·tan(ω/2), equidistant projection y'=f·ω, equi-solid angle projection y'=2f·sin(ω/2), and orthographic projection y'=2f·sin ω. It can be seen from the above equations that when the focal length f is fixed, the image height y' increases with the increase of the filed of view and the half field of view. When the value of y' is too great, it is impossible to project the entire image onto the image plane, unless the peripheral image is compressed. As a result, the peripheral image will be unrecognizable. If used in a monitor, the blurred peripheral image probably makes it impossible to show the criminal face clearly. If used on a rear view monitor system of a vehicle, the blurred peripheral image probably makes the driver knock down the object or child behind the vehicle.

The current image processing technology is advanced and the distortion aberration of the lens system can be compensated by using the imaging processing technology, however, the image still has the problem of image distortion after being processed. If the distorted ad blurred peripheral image can be avoided, the wide-angle lens system will have a wider and brighter future. Therefore, based on many years of experience in lens system researching, the inventor of this invention has invented a high sharpness wide-angle lens system which can prevent extreme image distortion.

SUMMARY OF THE INVENTION

The primary objective of the present invention is to provide a wide-angle lens system which comprises four lens elements and an aperture stop arranged sequentially from the object side to the image side as follows: the first lens element, the second lens element, the third lens element, the aperture stop, and the fourth lens element. The first and second lens elements are negative meniscus lens elements with an object-side convex surface, and both of the third and fourth lens elements are biconvex. At least four of the surfaces of the first, second and third lens elements are aspheric surfaces, and both surfaces of the fourth lens element are aspheric. Such arrangements can produce an aberration compensation effect with the least number of lens elements.

When the field of view of the wide-angle lens system is 140 degrees, under the effect of the negative refractive power of the first and second lens elements, the incident light will enter the third lens element at an adjusted angle. However, the light passed through the second lens element still has negative distortion aberration, astigmatic aberration, and magnification chromatic aberration, which can be compensated by the positive refractive power of the third and fourth lens elements. It is apparent that even if the field of view of the wide-angle lens system is as high as 140 degrees, the extreme distortion of the image edge can be prevented with the least four lens elements, and the image has a high sharpness.

In addition, the effective focal length from the first lens element to the third lens element is $f_{123}$, the focal length of the wide-angle lens system is f, and they satisfy the relations: $-15.0 < f_{123}/f < -8.0$.

When $f_{123}/f > -8.0$, the negative refractive power of the first and second lens elements will increase and cause excessive compression of the image edge, which needs to be compensated by image processing technology. When $f_{123}/f < -15.0$, to guide the incident light with field of view of 140 degrees, the outer diameter of the first lens element must increase accordingly, thus increasing the difficulty of miniaturization.

When the focal length of the fourth lens element is $f_4$, the following relation should be satisfied:

$$-6.5 < f_{123}/f_4 < -3.0. \quad \text{Relation 2}$$

When $f_{123}/f_4 > -3.0$, the positive refractive power of the fourth lens element will decrease, the positive and negative distortion aberrations cannot be compensated completely and must be compensated by using imaging processing. When $f_{123}/f_4 < -6.5$, the positive refractive power of the fourth lens element will increase, and it needs an extra lens element to form the image. However, determining the positive refractive power of the third lens 3 based on the relation 1 can solve this problem.

The radius of curvature of the object-side surface of the third lens element is r5, the radius of curvature of the image-side surface of the third lens element is r6, and they satisfy the relation:

$$0.6 < (r6+r5)/(r6-r5) < 1.0 \quad \text{Relation 3}$$

When (r6+r5)/(r6−r5)>1.0, the radius of curvature of the object-side surface will be reduced, although this is helpful in compensating distortion aberration, the astigmatic aberration and coma aberration compensation effect is reduced, which results in a low sharpness of the image. When (r6+r5)/(r6−r5)<0.6, it is unable to obtain the desired effect of distortion aberration compensation.

When the radius of curvature of the object-side surface of the fourth lens element is r8, the radius of curvature of the image-side surface of the fourth lens element is r9, and they satisfy the relation:

$$-0.55<(r9+r8)/(r9-r8)<-0.45. \quad \text{Relation 4}$$

When (r9+r8)/(r9−r8)>−0.45, the spherical aberration compensation will be insufficient. When (r9+r8)/(r9−r8)<−0.55, the spherical aberration compensation will be excessive, resulting in a low sharpness at the center of the image.

BRIEF DESCRIPTION OF THE DRAWINGS

FIG. 1Bb shows the astigmatic aberration curves in accordance with the first embodiment of the present invention;

FIG. 1Bc shows the distortion aberration curve in accordance with the first embodiment of the present invention;

FIG. 2Bb shows the astigmatic aberration curves in accordance with the second embodiment of the present invention;

FIG. 2Bc shows the distortion aberration curve in accordance with the second embodiment of the present invention;

FIG. 3Bb shows the astigmatic aberration curves in accordance with the third embodiment of the present invention;

FIG. 3Bc shows the distortion aberration curve in accordance with the third embodiment of the present invention;

FIG. 4Bb shows the astigmatic aberration curves in accordance with the fourth embodiment of the present invention;

FIG. 4Bc shows the distortion aberration curve in accordance with the fourth embodiment of the present invention;

FIG. 5Bb shows the astigmatic aberration curves in accordance with the fifth embodiment of the present invention;

FIG. 5Bc shows the distortion aberration curve in accordance with the fifth embodiment of the present invention;

FIG. 6Bb shows the astigmatic aberration curves in accordance with the sixth embodiment of the present invention;

FIG. 6Bc shows the distortion aberration curve in accordance with the sixth embodiment of the present invention;

FIG. 7Bb shows the astigmatic aberration curves in accordance with the seventh embodiment of the present invention; and FIG. 7Bc shows the distortion aberration curve in accordance with the seventh embodiment of the present invention.

DETAILED DESCRIPTION OF THE PREFERRED EMBODIMENTS

Figure 1A:
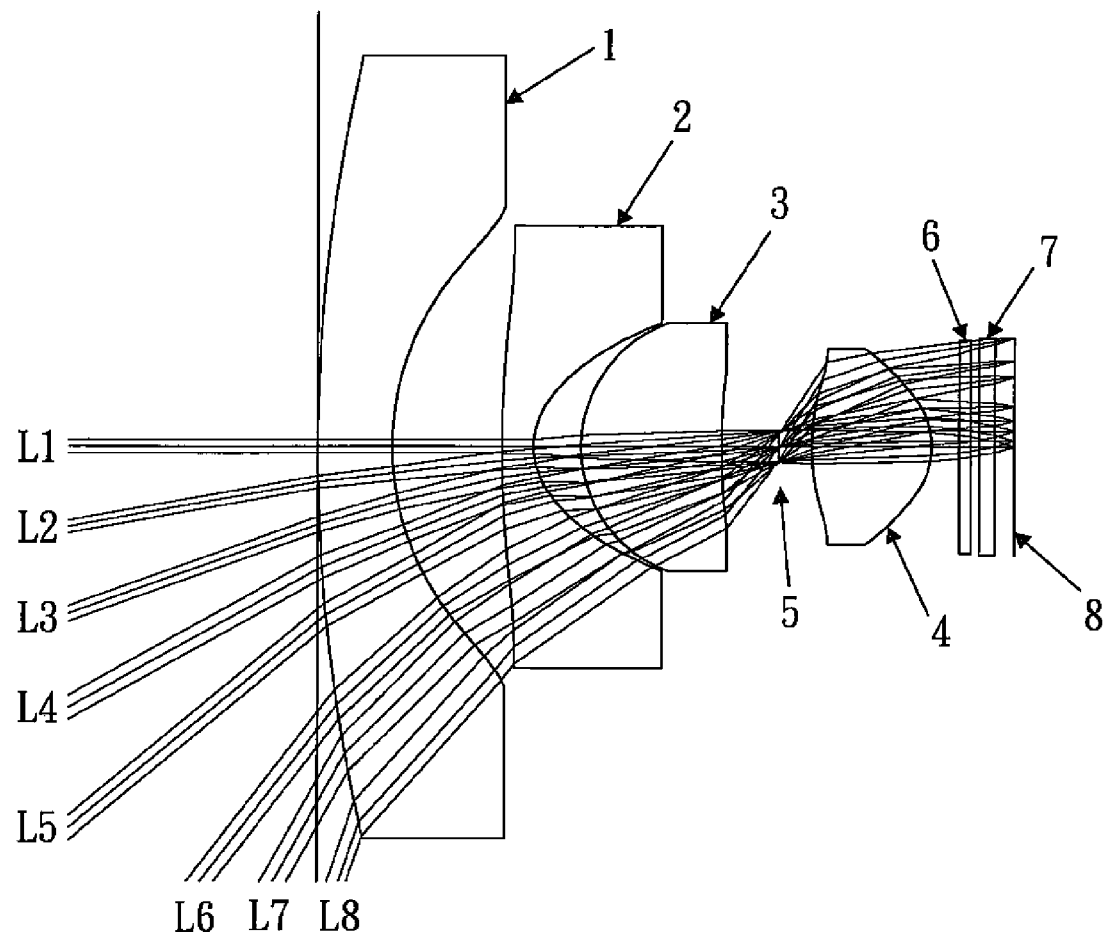
FIG. 1A shows a wide-angle lens system in accordance with a first embodiment of the present invention.
Figure 1B:
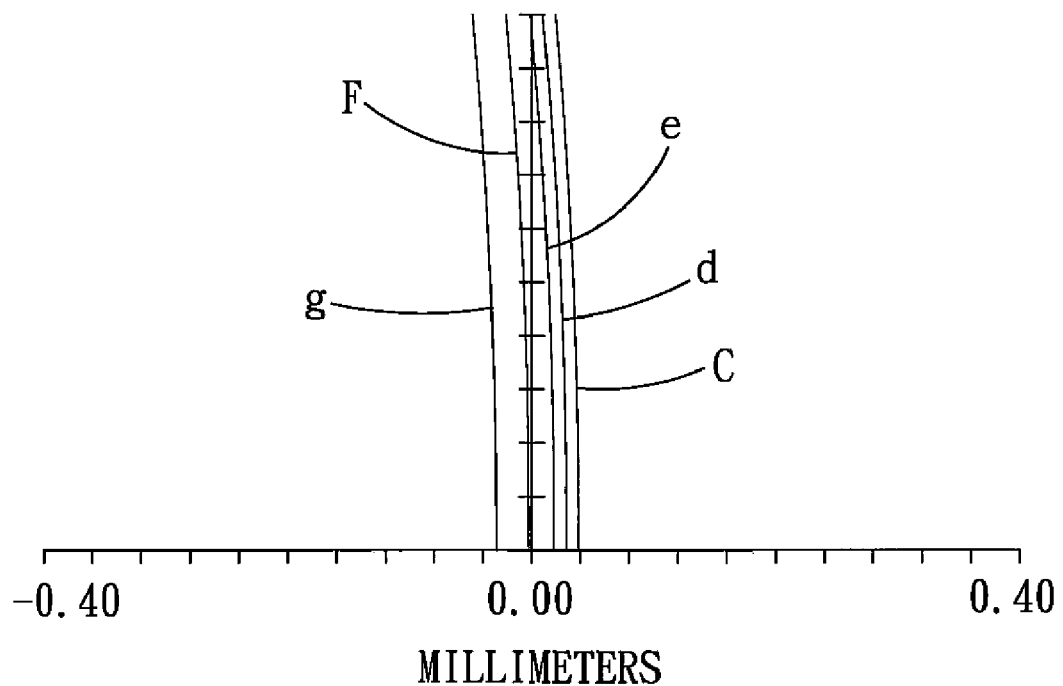
FIG. 1Ba shows the spherical aberration curves in accordance with the first embodiment of the present invention.
Figure 1B:
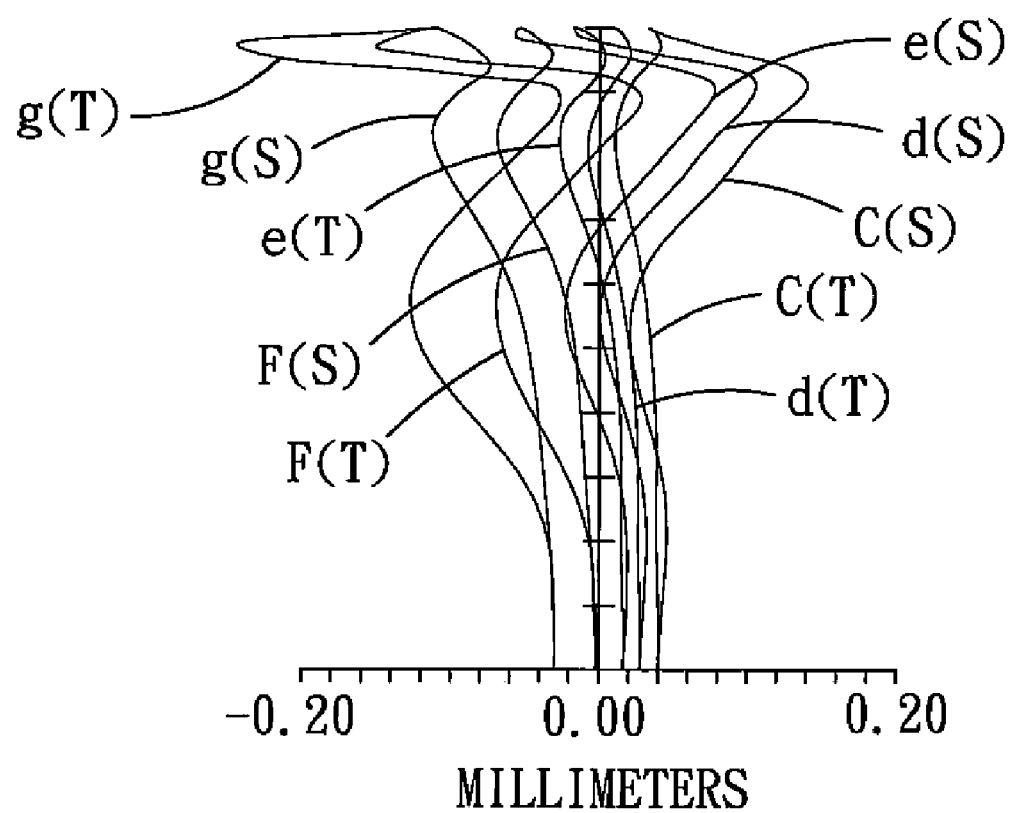
Figure 1B:
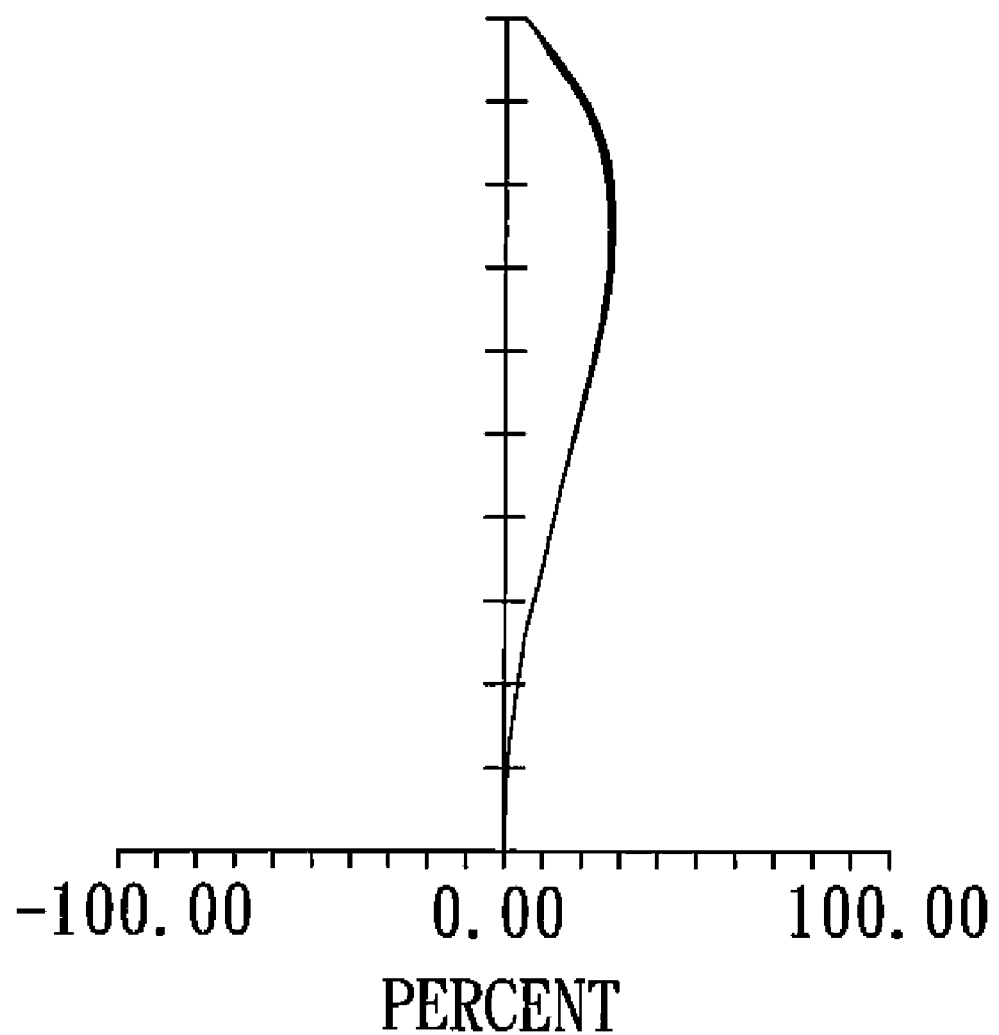

The present invention will be clearer from the following description when viewed together with the accompanying drawings, which show, for purpose of illustrations only, the preferred embodiment in accordance with the present invention.

FIGS. 1-7 show the respective embodiments of a wide-angle lens system in accordance with the present invention, which are particularly used in the monitor or vehicle-related lens system with a field of view of approximately 140 degrees, and FIGS. 1A-7A show the respective embodiments of a wide-angle lens system in accordance with the present invention. The wide-angle lens system comprises, from the object side to the image side: a first lens element 1, a second lens element 2, a third lens element 3, an aperture stop 5, a fourth lens element 4, an IR (infrared) filter 6, a glass cover 7, and an image plane 8.

The first lens element 1 is a negative meniscus element with a convex object-surface surface. The second lens element 2 is a negative meniscus element with a convex object-surface surface. The third lens element 3 has two convex surfaces. The fourth lens element 4 has two convex surfaces. The first, second, third and fourth lens elements 1, 2, 3, 4 are made of plastic material for saving material cost. At least four of the surfaces of the first, second and third lens elements 1, 2, 3 are aspheric surfaces. Both surfaces of the fourth lens element 4 are aspheric. The IR filter 6 and the glass cover 7 are made of flat glass. The IR filter 6 serves to block infrared rays and the glass cover 7 is arranged on the image plane 8 for protecting the CCD (Charge Coupled Device) or CMOS (Complementary Metal Oxide Semiconductor).

In this embodiment of the wide-angle lens system of the present invention, lights L1, 2, 3, 4, 5, 6, 7, 8 enter the wide-angle lens system at incident angles of 0, 21, 35, 42, 49, 46, 63 and 70 degrees, respectively, and are projected on the image plane. It is evident from the figures that there is not an extreme compression at the peripheral edge of the image, and thus a comparatively intact and correct image can be formed, and the image has a higher sharpness.

FIGS. 1B-7B show the aberration of FIGS. 1A-7A, wherein (a) shows spherical aberration curves, curves C, d, e, F and g represent the spherical aberration of the lights of different wavelength, and unit is mm. (b) shows astigmatic field curves of the lights of different wavelength, unit is mm, wherein S and T represent horizontal and vertical aberrations, respectively. (c) shows distortion curves of the lights of different wavelength, unit is %. It is apparent from the figures that the wide-angle lens system has corrected the respective aberrations to a practical level.

In the following respective embodiments of the wide-angle lens system of the present invention, the focal length of the wind-angle lens system is f, the aperture stop value is F NO, the field of view is 2ω. The sequence numbers of the respective surfaces of the wide-angle lens system, from the object side to the image side, are described as follows: the surfaces of the first lens element 1 are S1 and S2. The surfaces of the second lens element are S3 and S4. The surfaces of the third lens element are S5 and S6. The surface of the aperture stop 5 is S7. The surfaces of the fourth lens element 4 are S8 and S9. The surfaces of the filter 6 are 10 and S11. The surfaces of the glass cover 7 are S12 and S13. The equation of the curve of the aspheric surfaces is expressed as follows:

$$X = (1/R)H^2/\{1+[1-(1+K)(H/R)^2]^{1/2}\}+AH^4+BH^6+CH^8+DH^{10}$$

A, B, C and D: the aspheric surface coefficients
H: the height of the optical axis
X: variable in the direction of the optical axis and is the base of the vertex of surface
R: paraxial radius of curvature
K: represents the conic coefficient;
E: represents scientific notation, for example: E-03 means $10^{-3}$.

In the embodiment of FIG. 1A, f is 0.868 mm, F No is 2.8, 2ω is 140 degrees, and the radius of curvature r (unit is mm), distance d (mm) between surfaces, index of refraction nd and reciprocal dispersion vd of the respective surfaces of the wide-angle lens system are shown in table 1A:

|     | r       | d     | nd   | vd   |
| --- | ------- | ----- | ---- | ---- |
| S1  | 37.482  | 1.658 | 1.53 | 56.3 |
| S2  | 5.1     | 2.481 |      |      |
| S3  | 13.033  | 0.703 | 1.53 | 56.3 |
| S4  | 1.3516  | 1.098 |      |      |
| S5  | 3.094   | 3.316 | 1.63 | 23.4 |
| S6  | −50.05  | 1.076 |      |      |
| S7  | ∞       | 0.768 |      |      |
| S8  | 3.6223  | 2.668 | 1.53 | 56.3 |
| S9  | −1.084  | 0.549 |      |      |
| S10 | ∞       | 0.3   | BSC7 |      |
| S11 | ∞       | 0.22  |      |      |
| S12 | ∞       | 0.4   | BSC7 |      |
| S13 | ∞       |       |      |      |

Table 1B shows the aspheric surface coefficients of the respective surfaces, except that the surface S1 of the first lens element 1 is a spherical surface, the surface S2 of the first lens element 1 and the surfaces S3, S4, S5, S6, S8 and S9 of the rest lens elements 2, 3 and 4 are all aspheric. And the values of K, A, B, C and D are shown in table 1B:

| S2 |            | S3 |             |
| -- | ---------- | -- | ----------- |
| K  | −0.30617   | K  | −130.592    |
| A  | −1.4258E−04 | A  | 2.06049E−05 |
| B  | −1.7796E−05 | B  | 3.69527E−05 |
| C  | −3.9258E−07 | C  | −2.1735E−06 |
| D  | −2.2476E−08 | D  | 2.55094E−08 |
| S4 |            | S5 |             |
| K  | −2.22925   | K  | 0.014399    |
| A  | 0.019928   | A  | 2.69735E−03 |
| B  | −5.8237E−04 | B  | −1.5359E−04 |
| C  | 6.74317E−05 | C  | 1.34546E−05 |
| D  | 7.26238E−07 | D  | 0.0000      |
| S6 |            | S8 |             |
| K  | 0.0000     | K  | −10.2785    |
| A  | 0.010417   | A  | −2.5238E−03 |
| B  | −7.4480E−05 | B  | 2.85871E−03 |
| C  | −1.2656E−04 | C  | −6.7331E−04 |
| D  | 0.0000     | D  | 3.18772E−05 |
| S9 |            |    |             |
| K  | −2.16306   |    |             |
| A  | −0.014978  |    |             |
| B  | 2.66345E−03 |    |             |
| C  | 1.10642E−04 |    |             |
| D  | −6.4109E−05 |    |             |

In this embodiment, the lens elements 1, 2, 3, and 4 are made of plastic material, and the IR filter 6 and the glass cover 7 are made of colorless glass (BSC7).

Figure 2A:
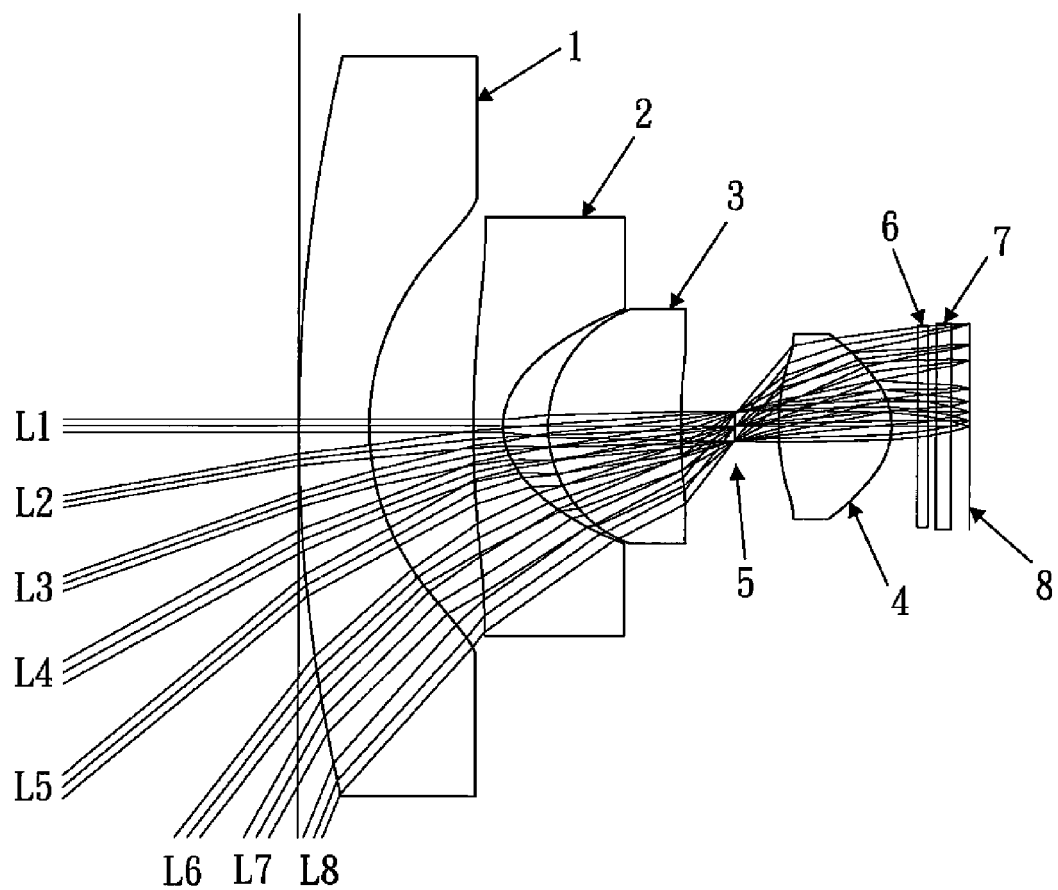
FIG. 2A shows a wide-angle lens system in accordance with a second embodiment of the present invention.
Figure 2B:
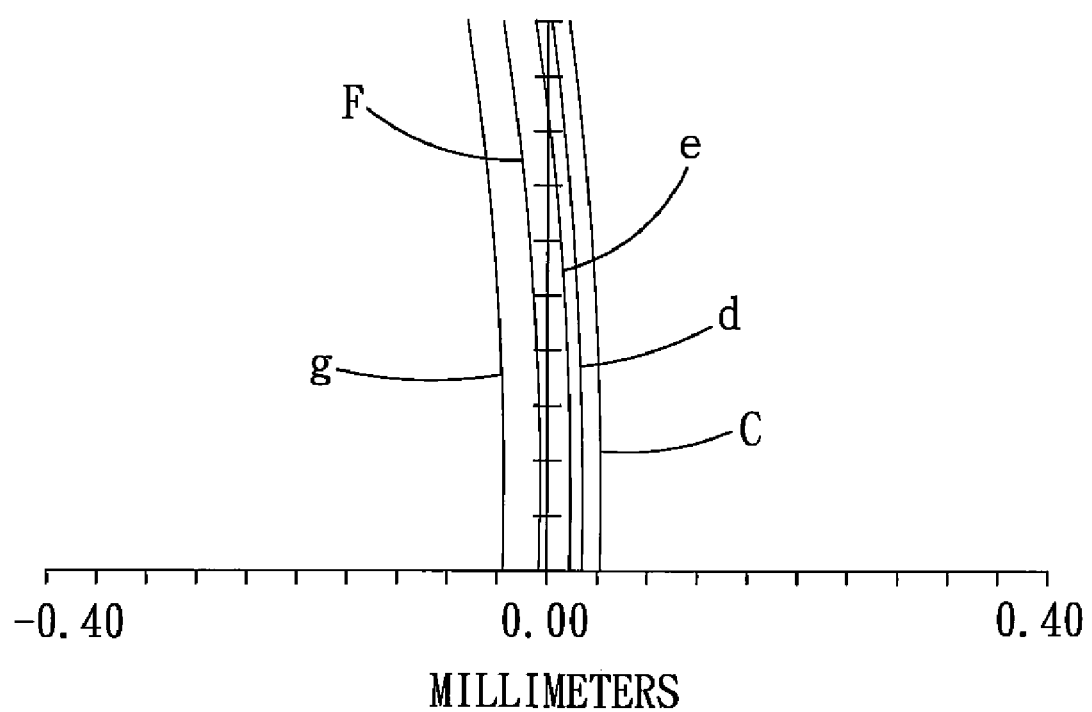
FIG. 2Ba shows the spherical aberration curves in accordance with the second embodiment of the present invention.
Figure 2B:
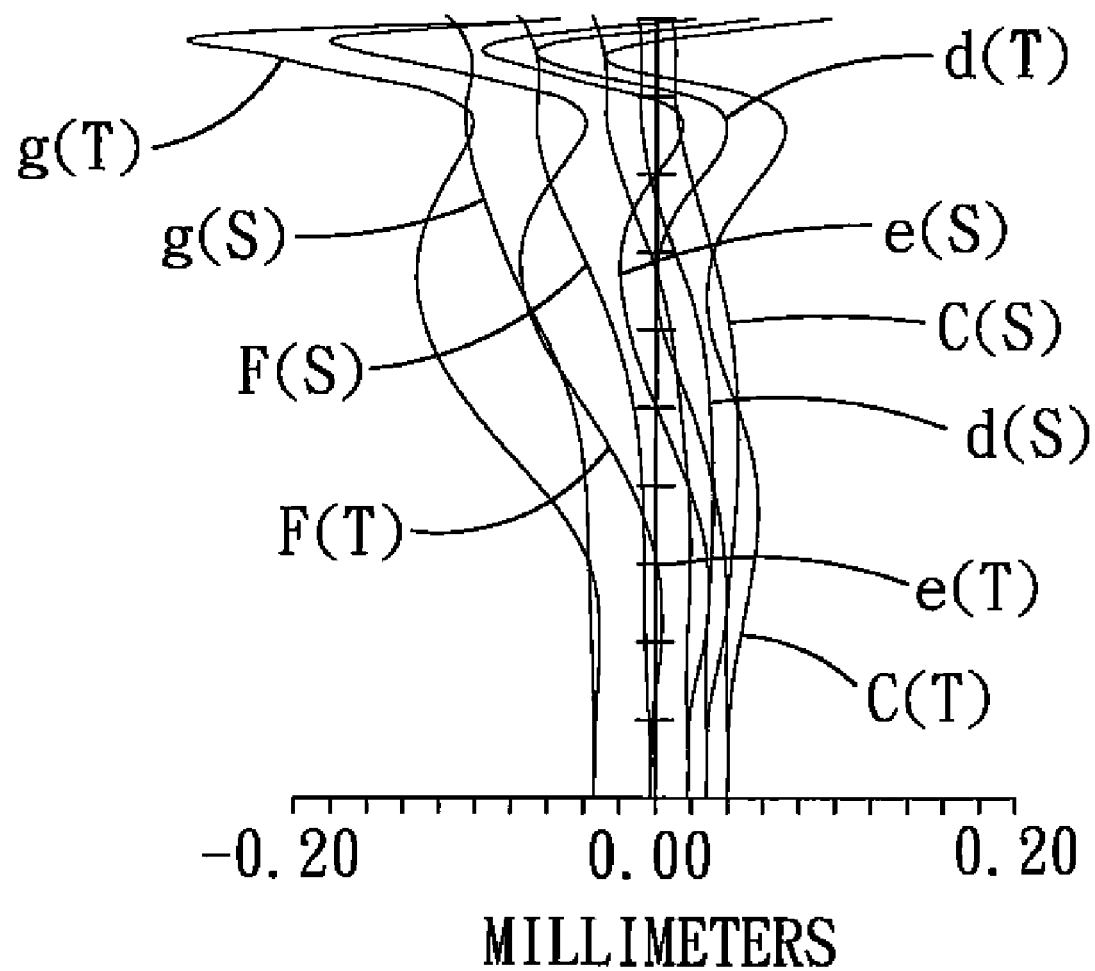
Figure 2B:
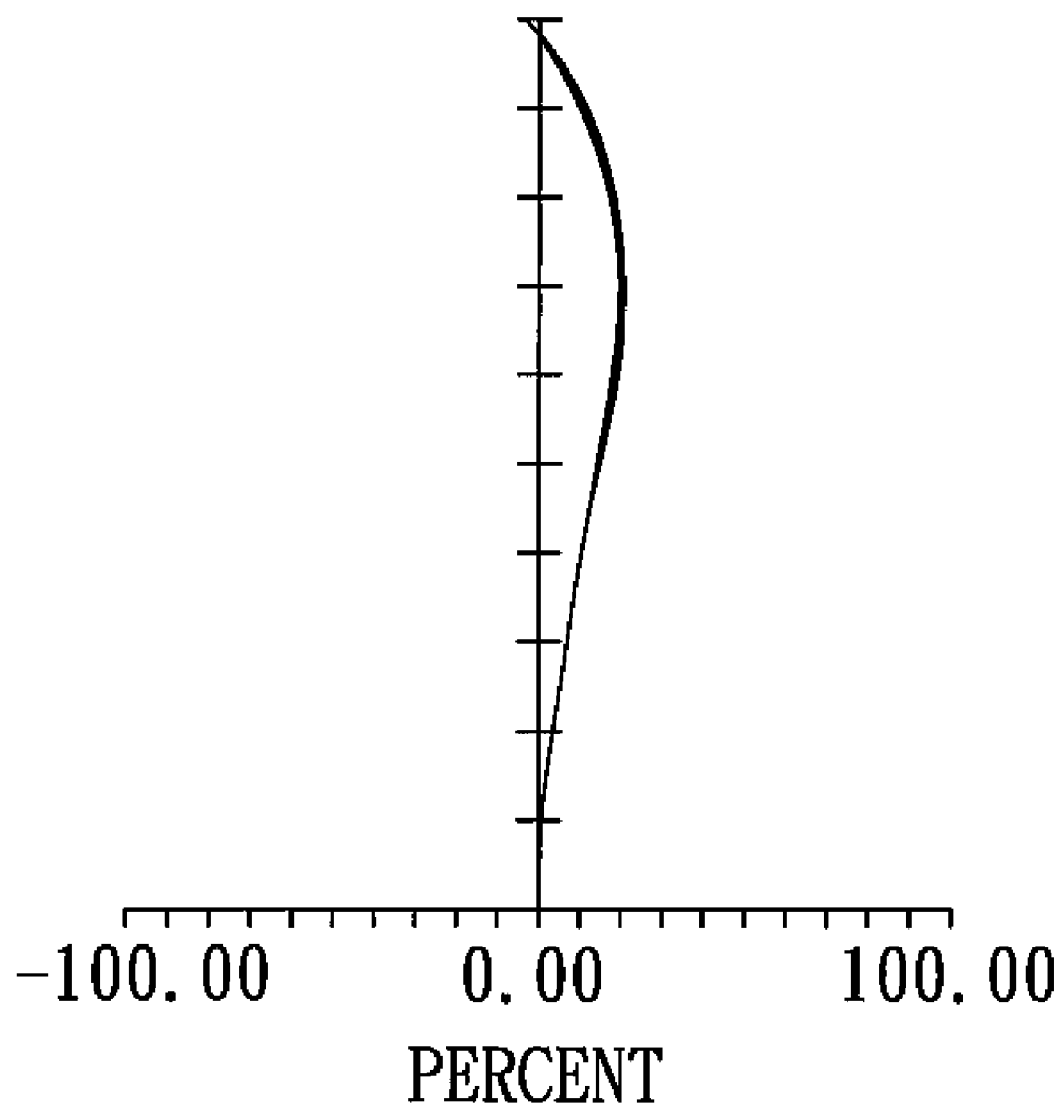

In the embodiment of FIG. 2A, f is 0.881 mm, F No is 2.8, 2ω is 140 degrees, and the radius of curvature r (unit is mm), distance d (mm) between surfaces, index of refraction nd and reciprocal dispersion vd of the respective surfaces of the wide-angle lens system are shown in table 2A:

|     | r       | D     | nd   | vd   |
| --- | ------- | ----- | ---- | ---- |
| S1  | 30.933  | 1.319 | 1.53 | 56.3 |
| S2  | 4.6259  | 2.167 |      |      |
| S3  | 24.701  | 0.598 | 1.53 | 56.3 |
| S4  | 1.3649  | 1.086 |      |      |
| S5  | 3.0326  | 3.003 | 1.63 | 23.4 |
| S6  | −23.66  | 0.977 |      |      |
| S7  | ∞       | 0.847 |      |      |
| S8  | 3.7781  | 2.36  | 1.53 | 56.3 |
| S9  | −1.12   | 0.5   |      |      |
| S10 | ∞       | 0.3   | BSC7 |      |
| S11 | ∞       | 0.2   |      |      |
| S12 | ∞       | 0.4   | BSC7 |      |
| S13 | ∞       |       |      |      |

Table 2B shows the aspheric surface coefficients of the respective surfaces, except that the surface S1 of the first lens element 1 is a spherical surface, the surface S2 of the first lens element 1 and the surfaces S3, S4, S5, S6, S8 and S9 of the rest lens elements 2, 3 and 4 are all aspheric. In this embodiment, the lens elements 1, 2, 3, and 4 are made of plastic material, and the IR filter 6 and the glass cover 7 are made of colorless glass (BSC7).

| S2 |             | S3 |             |
| -- | ----------- | -- | ----------- |
| K  | −0.29195    | K  | −307.964    |
| A  | −3.6889E−04 | A  | −2.8127E−05 |
| B  | −3.3492E−05 | B  | 5.64126E−05 |
| C  | −9.0847E−07 | C  | −4.1176E−06 |
| D  | −5.1873E−08 | D  | 5.76249E−08 |
| S4 |             | S5 |             |
| K  | −2.26337    | K  | 0.131281    |
| A  | 0.023806    | A  | 1.66395E−03 |
| B  | −1.0143E−03 | B  | −2.2361E−04 |
| C  | 1.67306E−04 | C  | 2.78828E−05 |
| D  | 1.12956E−05 | D  | 0.0000      |
| S6 |             | S8 |             |
| K  | 0.00000     | K  | −8.24701    |
| A  | 7.14915E−03 | A  | −7.1405E−03 |
| B  | 7.43519E−05 | B  | 4.32695E−03 |
| C  | −2.4614E−04 | C  | −1.1861E−03 |
| D  | 0.0000      | D  | 4.46248E−05 |
| S9 |             |    |             |
| K  | −2.28854    |    |             |
| A  | −2.06280E−02 |    |             |
| B  | 4.03999E−03 |    |             |
| C  | 1.91367E−04 |    |             |
| D  | −1.6005E−04 |    |             |

Figure 3A:
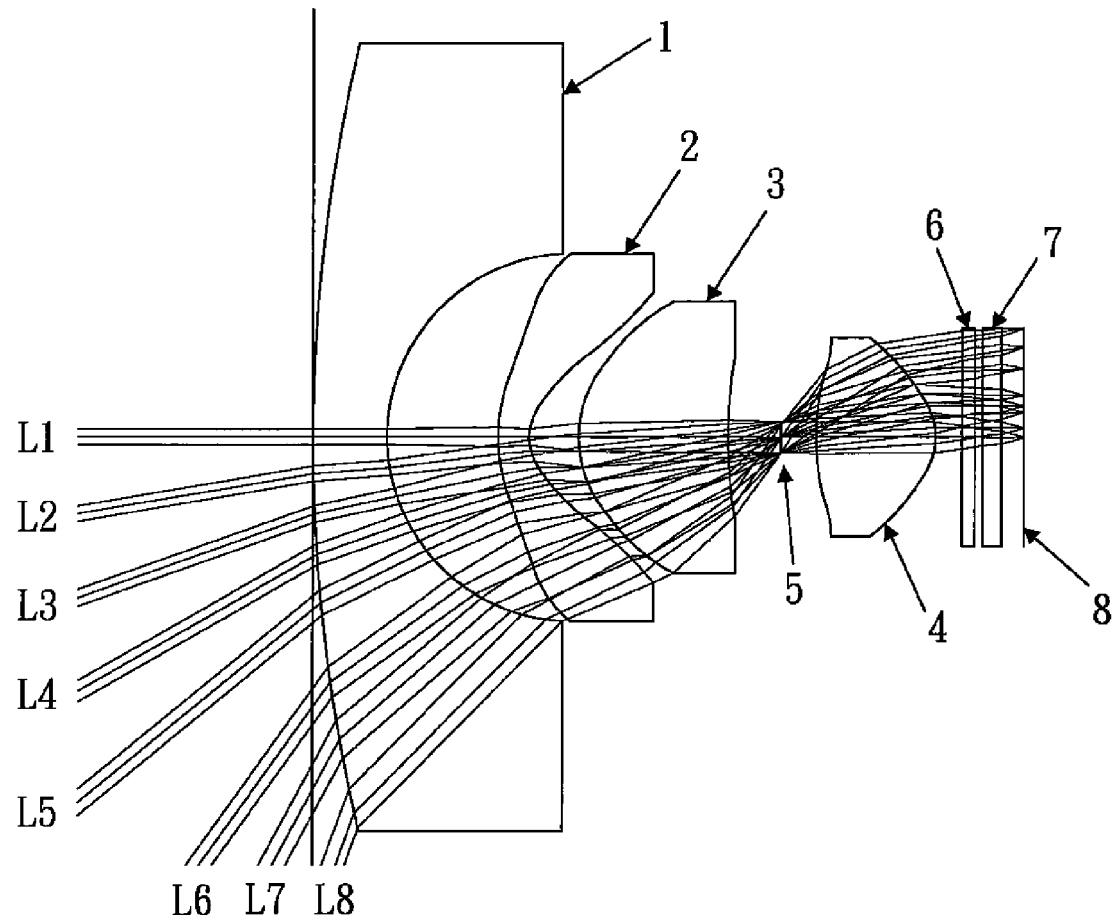
FIG. 3A shows a wide-angle lens system in accordance with a third embodiment of the present invention.
Figure 3B:
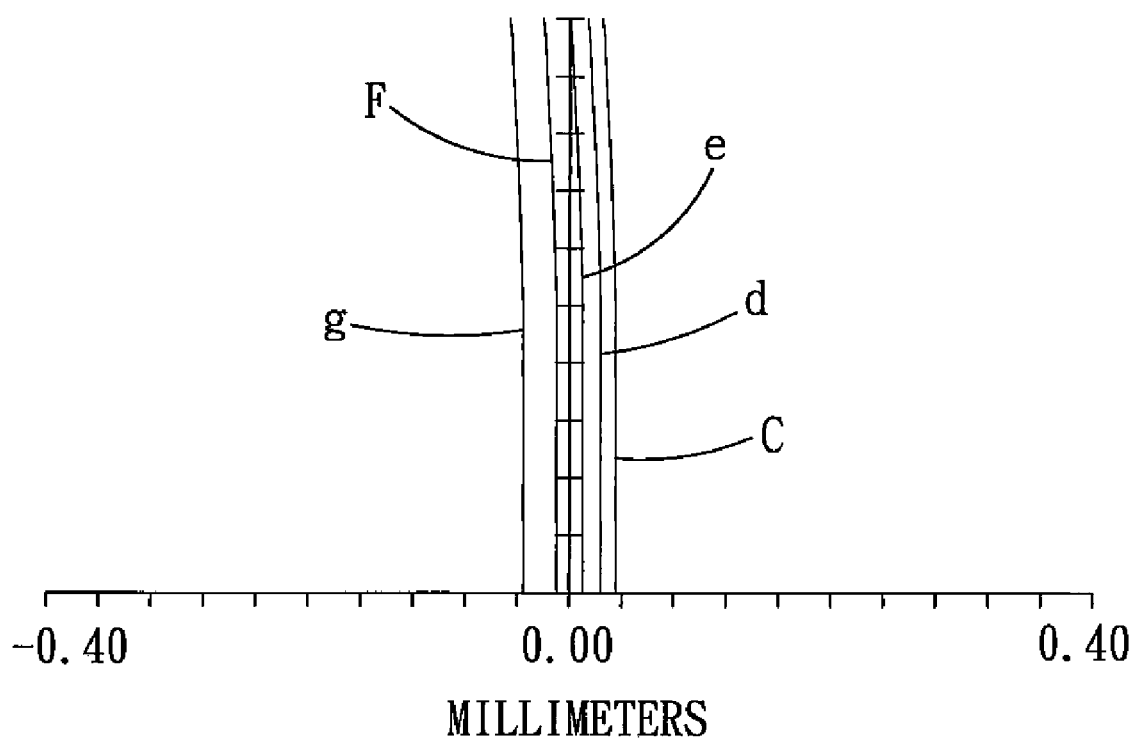
FIG. 3Ba shows the spherical aberration curves in accordance with the third embodiment of the present invention.
Figure 3B:
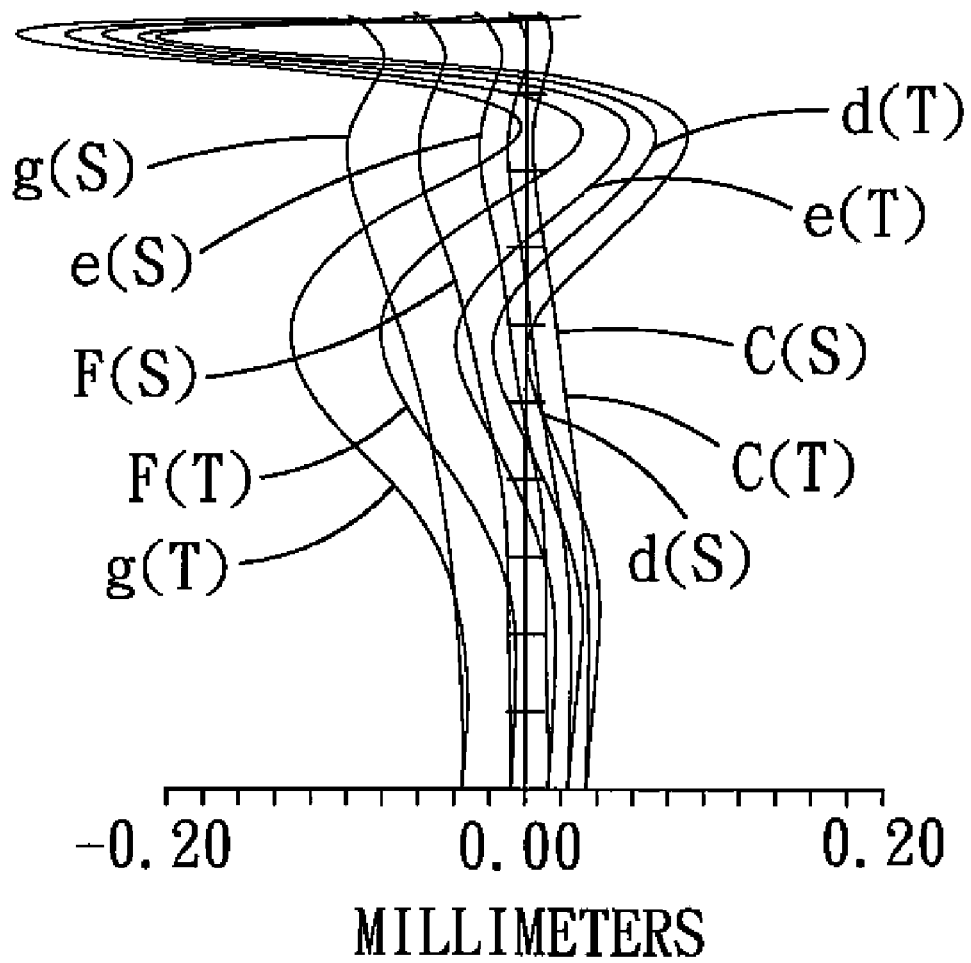
Figure 3B:
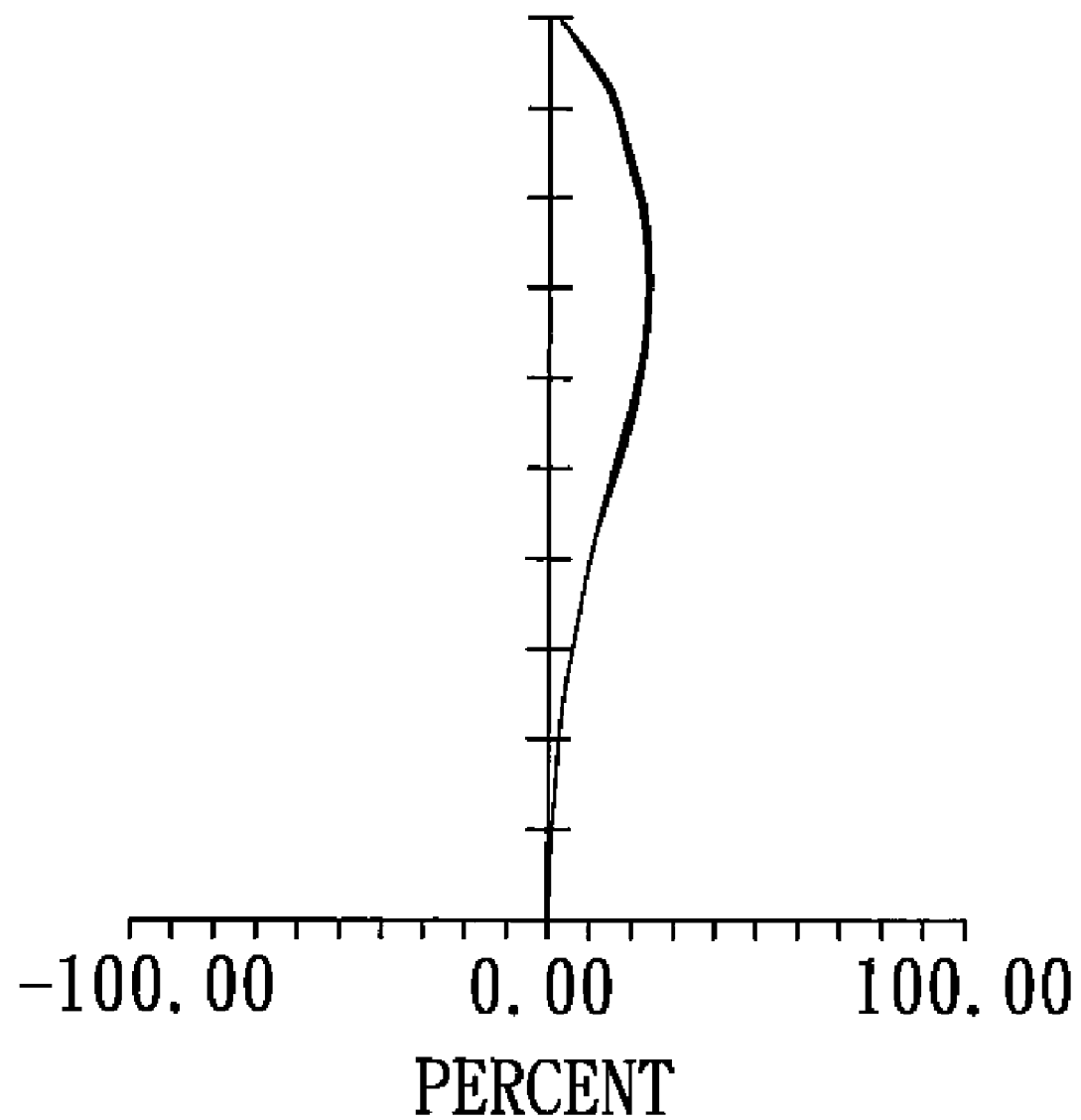

In the embodiment of FIG. 3A, f is 0.885 mm, F No is 2.8, 2ω is 140 degrees, and the radius of curvature r (unit is mm), distance d (mm) between surfaces, index of refraction nd and reciprocal dispersion vd of the respective surfaces of the wide-angle lens system are shown in table 3A:

|  | r | d | nd | vd |
|---|---|---|---|---|
| S1 | 38.075 | 1.658 | BSC7 |  |
| S2 | 4.1006 | 2.481 |  |  |
| S3 | 2.6583 | 0.703 | 1.53 | 56.3 |
| S4 | 0.9793 | 1.098 |  |  |
| S5 | 3.0961 | 3.316 | 1.63 | 23.4 |
| S6 | −139.7 | 1.076 |  |  |
| S7 | ∞ | 0.768 |  |  |
| S8 | 3.3993 | 2.668 | 1.53 | 56.3 |
| S9 | −1.104 | 0.549 |  |  |
| S10 | ∞ | 0.3 | BSC7 |  |
| S11 | ∞ | 0.22 |  |  |
| S12 | ∞ | 0.4 | BSC7 |  |
| S13 | ∞ |  |  |  |

Table 3B shows the aspheric surface coefficients of the respective surfaces, the surfaces S3, S4, S5, S6, S8 and S9 of the lens elements 2, 3 and 4 are all aspheric. In this embodiment, the lens elements 2, 3, and 4 are made of plastic material, and the first lens element 1, the IR filter 6 and the glass cover 7 are made of colorless glass (BSC7).

Figure 4A:
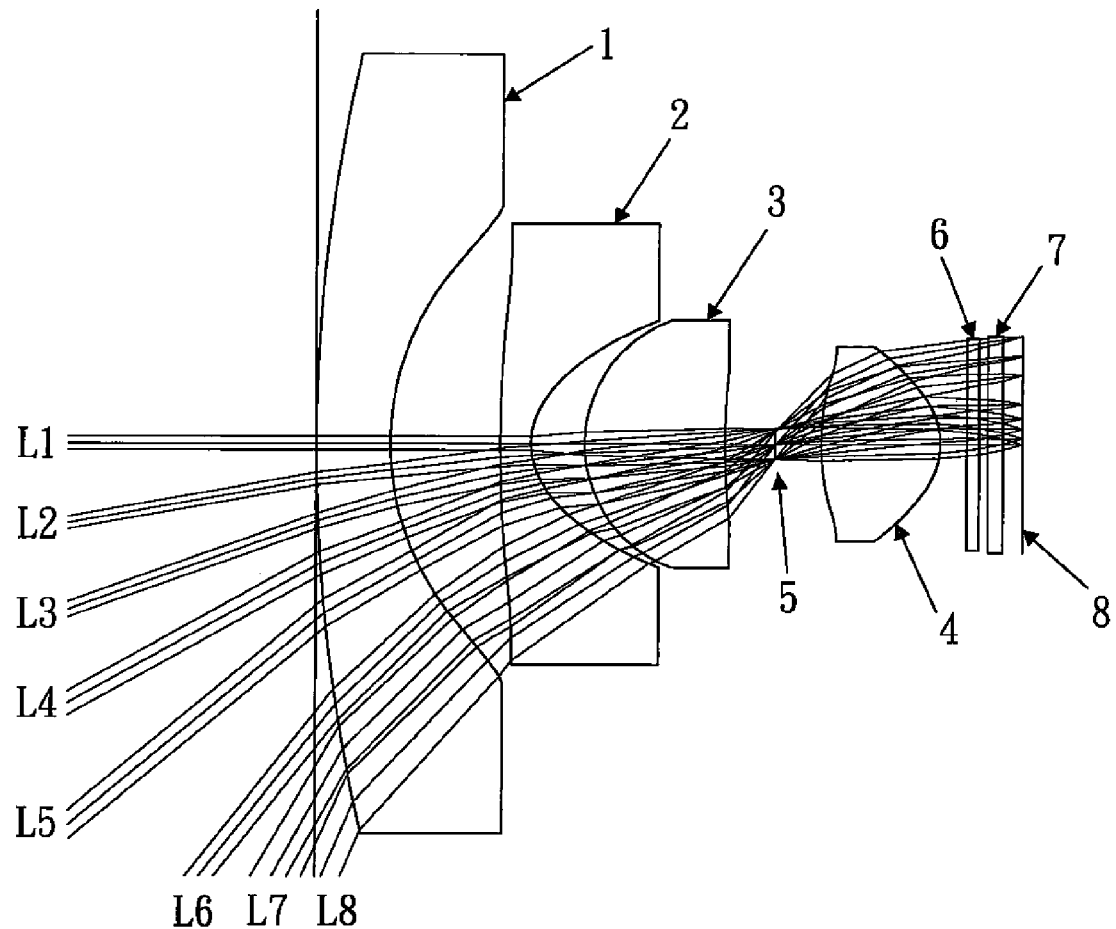
FIG. 4A shows a wide-angle lens system in accordance with a fourth embodiment of the present invention.
Figure 4B:
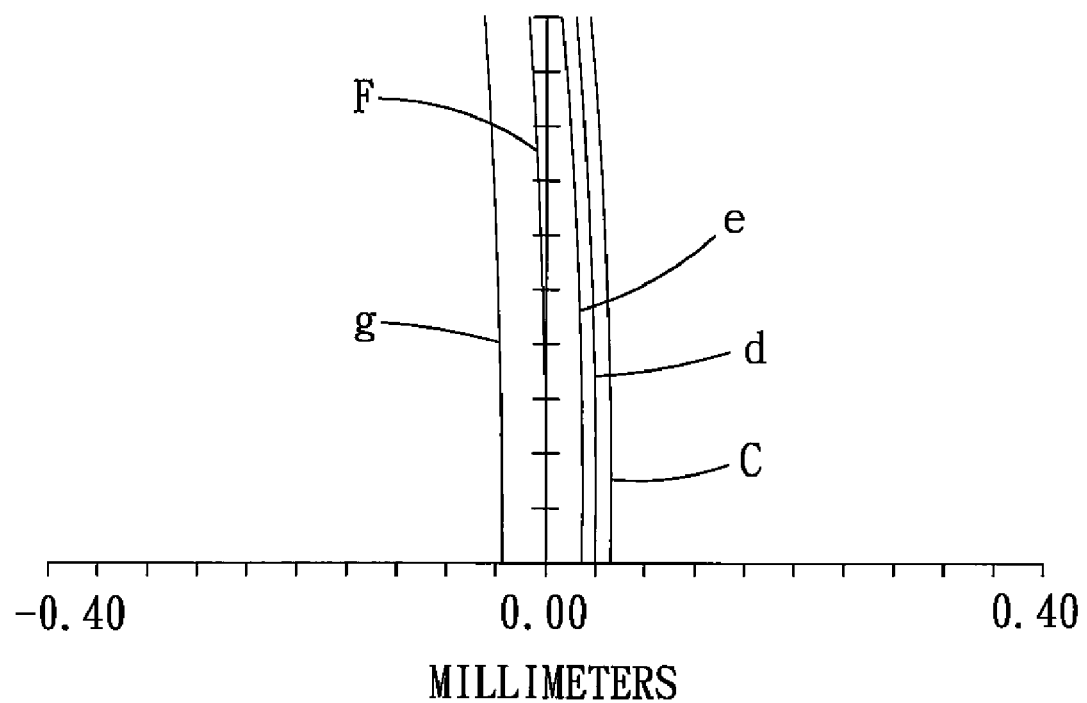
FIG. 4Ba shows the spherical aberration curves in accordance with the fourth embodiment of the present invention.
Figure 4B:
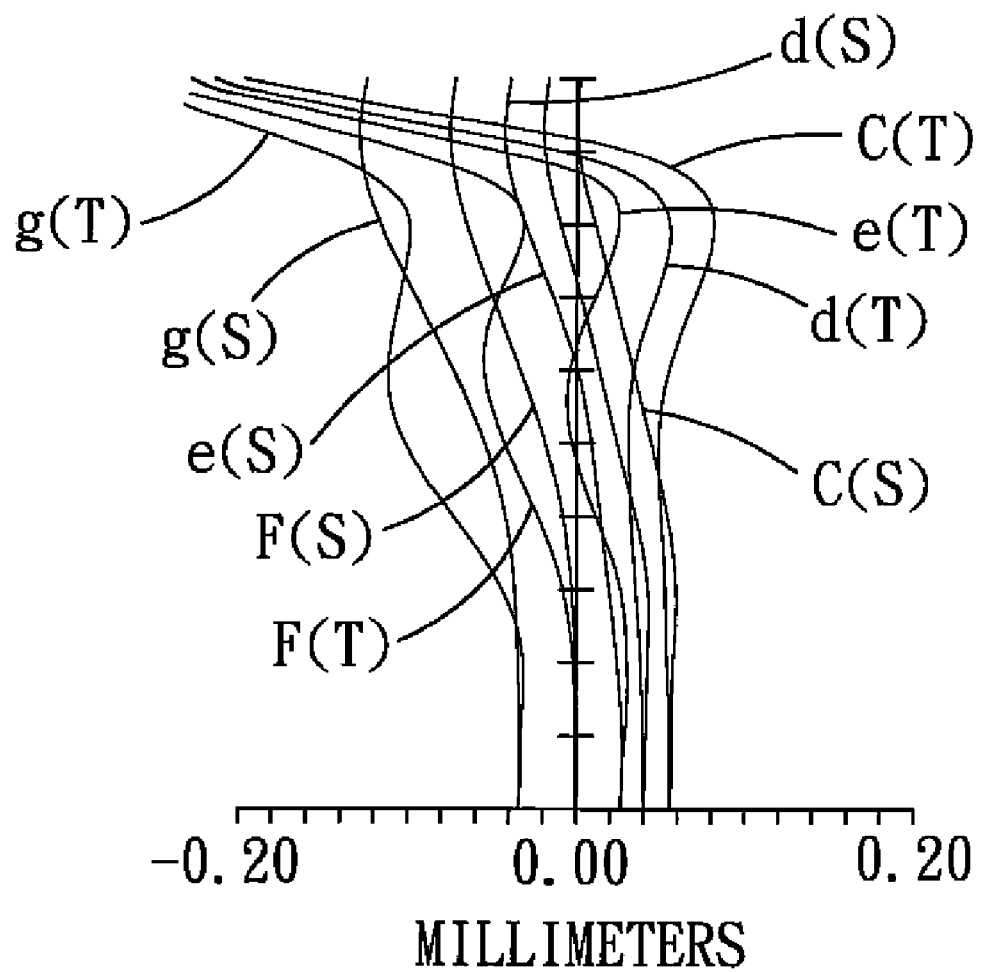
Figure 4B:
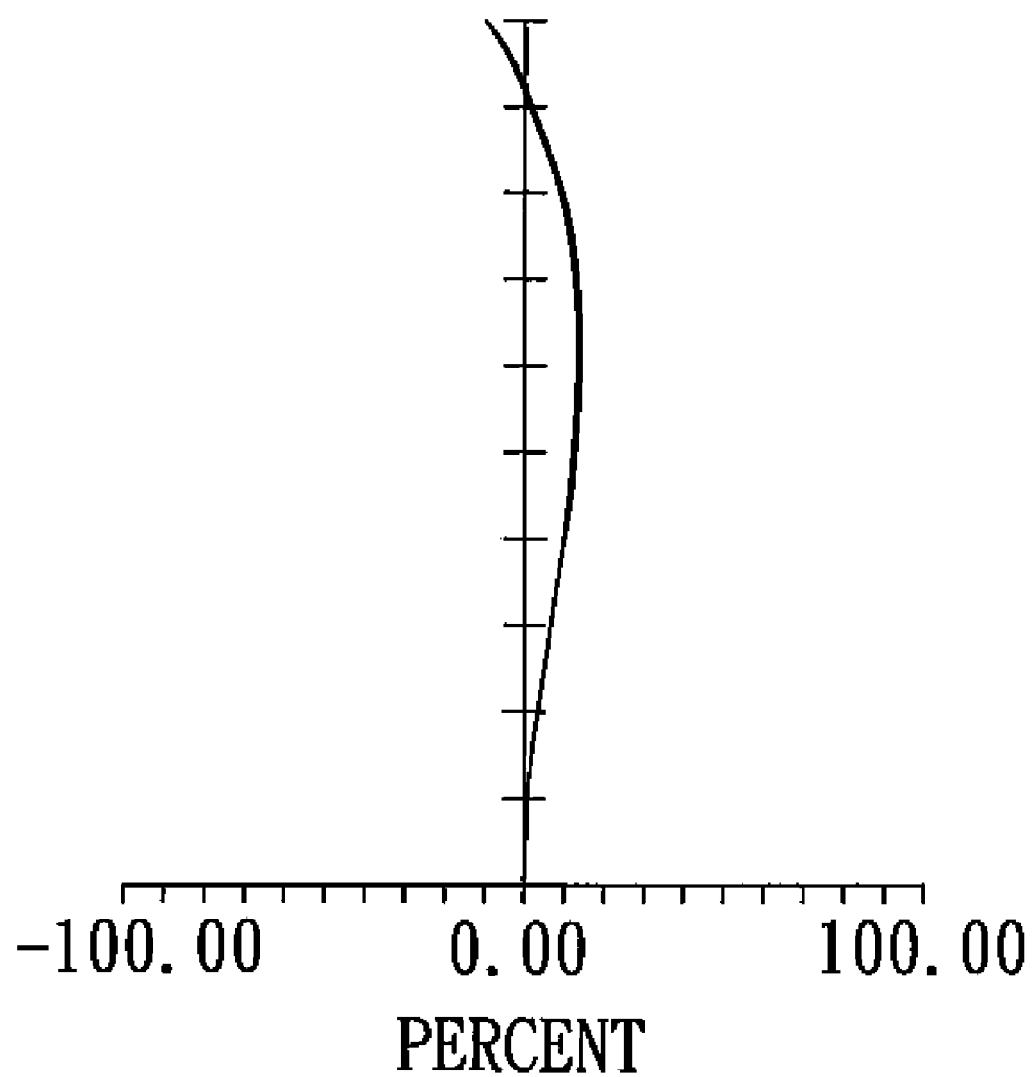

In the embodiment of FIG. 4A, f is 0.996 mm, F No is 2.8, 2ω is 140 degrees, and the radius of curvature r (unit is mm), distance d (mm) between surfaces, index of refraction nd and reciprocal dispersion vd of the respective surfaces of the wide-angle lens system are shown in table 4A:

|  | r | D | nd | vd |
|---|---|---|---|---|
| S1 | 33.156 | 1.042 | 1.53 | 56.3 |
| S2 | 4.6052 | 2.11 |  |  |
| S3 | 192.48 | 0.599 | 1.53 | 56.3 |
| S4 | 1.502 | 1.075 |  |  |
| S5 | 3.0814 | 3 | 1.63 | 23.4 |
| S6 | −15.93 | 0.977 |  |  |
| S7 | ∞ | 0.94 |  |  |
| S8 | 3.5563 | 2.571 | 1.53 | 56.3 |
| S9 | −1.256 | 0.5 |  |  |
| S10 | ∞ | 0.3 | BSC7 |  |
| S11 | ∞ | 0.2 |  |  |
| S12 | ∞ | 0.4 | BSC7 |  |
| S13 | ∞ |  |  |  |

Table 4B shows the aspheric surface coefficients of the respective surfaces, except that the surface S1 of the first lens element 1 is a spherical surface, the surface S2 of the first lens element 1 and the surfaces S3, S4, S5, S6, S8 and S9 of the rest lens elements 2, 3 and 4 are all asphehric.

| S2 |  | S3 |  |
|---|---|---|---|
| K | −0.317337 | K | −4061.767 |
| A | −3.7530E−04 | A | −2.7790E−05 |
| B | −3.2530E−05 | B | 5.7230E−05 |
| C | −1.0739E−06 | C | −4.1046E−06 |
| D | −5.7570E−08 | D | 5.9822E−08 |

| S4 |  | S5 |  |
|---|---|---|---|
| K | −2.627553 | K | −0.00068 |
| A | 2.5414E−02 | A | 7.8160E−04 |
| B | −1.1710E−03 | B | −1.0110E−04 |
| C | 1.26077E−04 | C | 1.63242E−05 |
| D | 8.1789E−06 | D | 0.0000 |

| S6 |  | S8 |  |
|---|---|---|---|
| K | 0.0000 | K | −7.540089 |
| A | 5.0869E−03 | A | −6.5570E−03 |
| B | 4.5473E−04 | B | 4.8564E−03 |
| C | −1.3770E−04 | C | −1.0794E−03 |
| D | 0.0000 | D | −1.3160E−04 |

| S9 |  |
|---|---|
| K | −2.573615 |
| A | −1.9237E−02 |
| B | 4.3423E−03 |
| C | 2.26471E−04 |
| D | −1.5790E−04 |

In this embodiment, the lens elements 1, 2, 3, and 4 are made of plastic material, and the IR filter 6 and the glass cover 7 are made of colorless glass (BSC7).

Figure 5A:
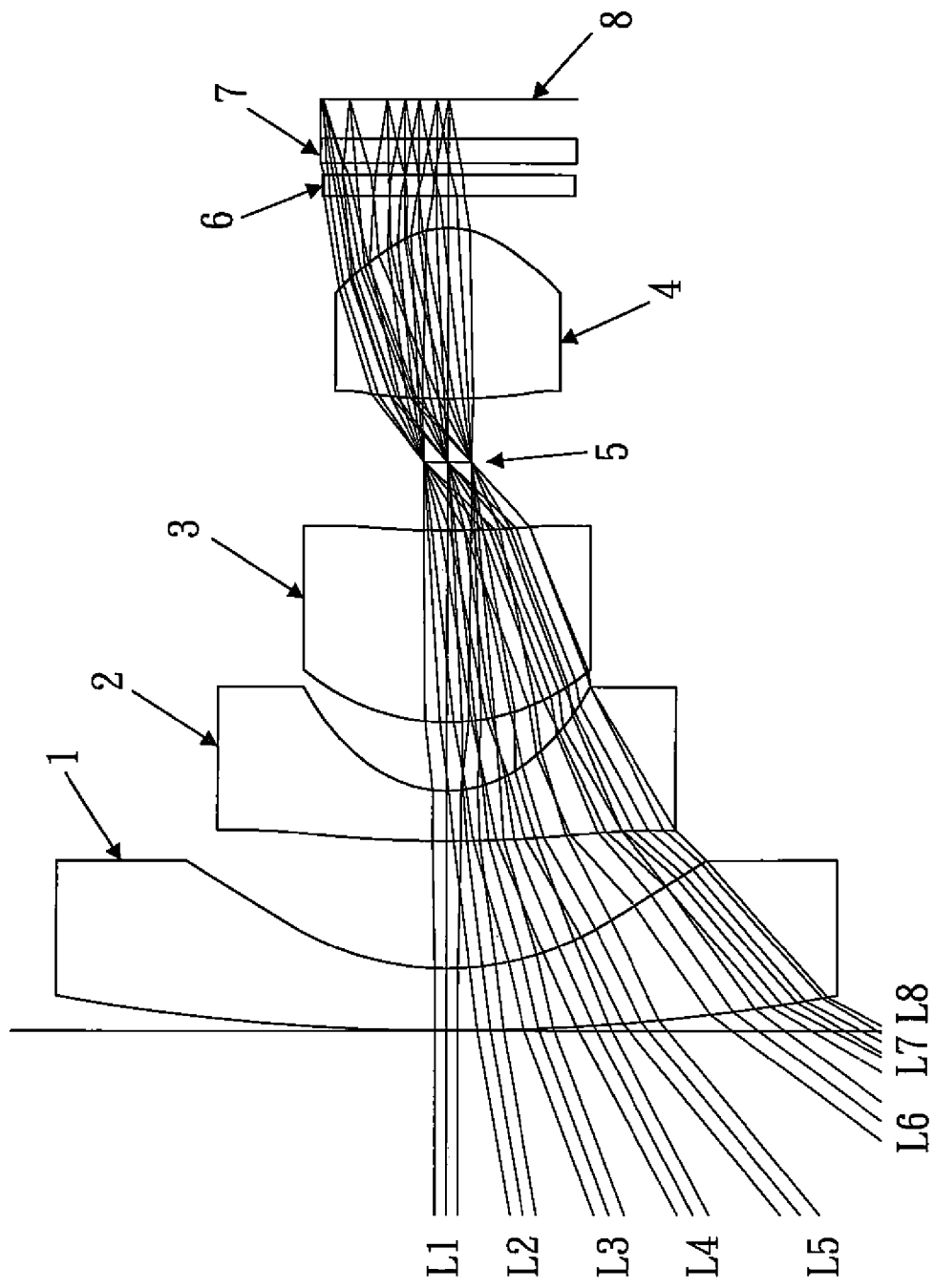
FIG. 5A shows a wide-angle lens system in accordance with a fifth embodiment of the present invention.
Figure 5B:
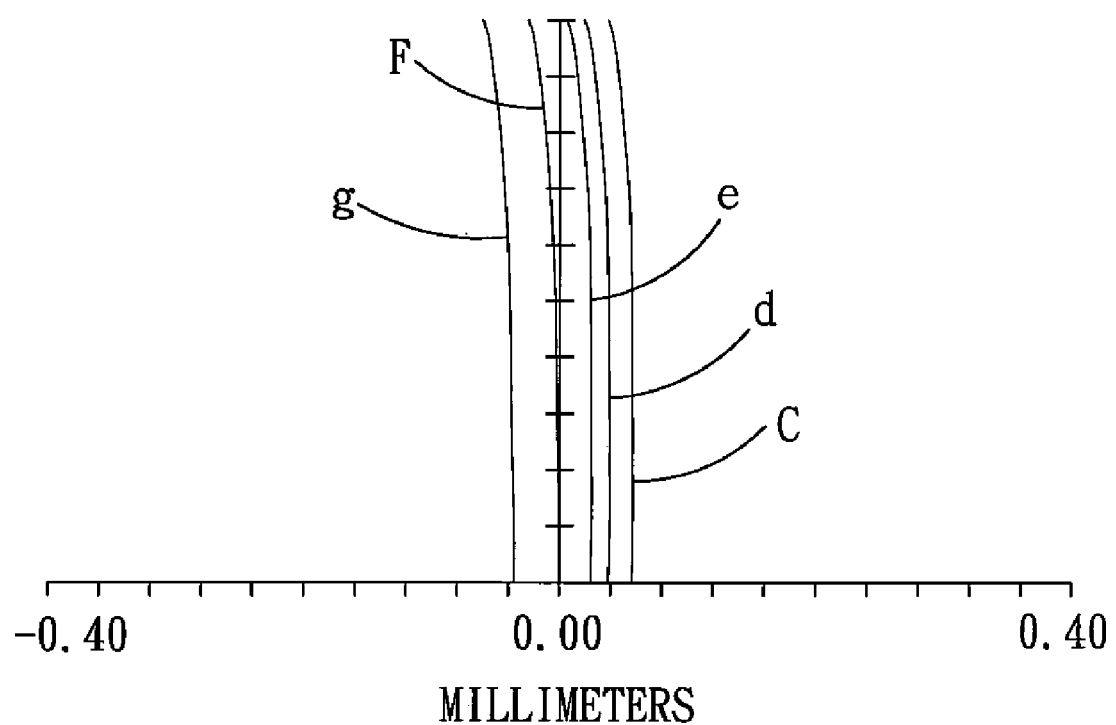
FIG. 5Ba shows the spherical aberration curves in accordance with the fifth embodiment of the present invention.
Figure 5B:
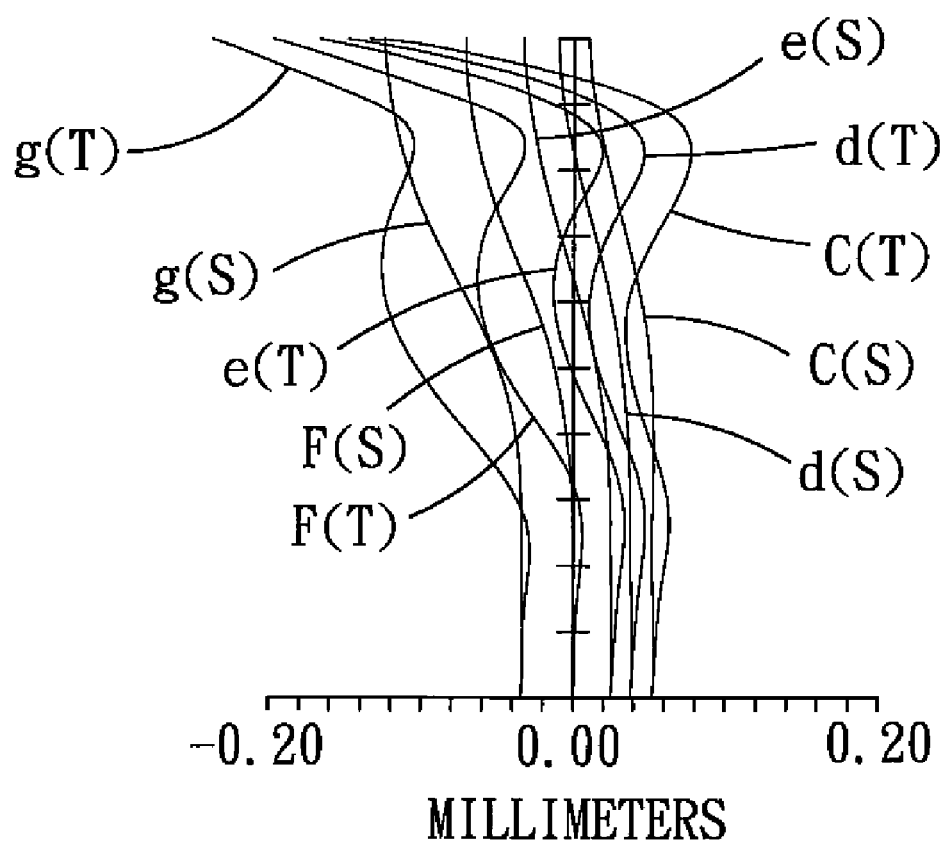
Figure 5B:
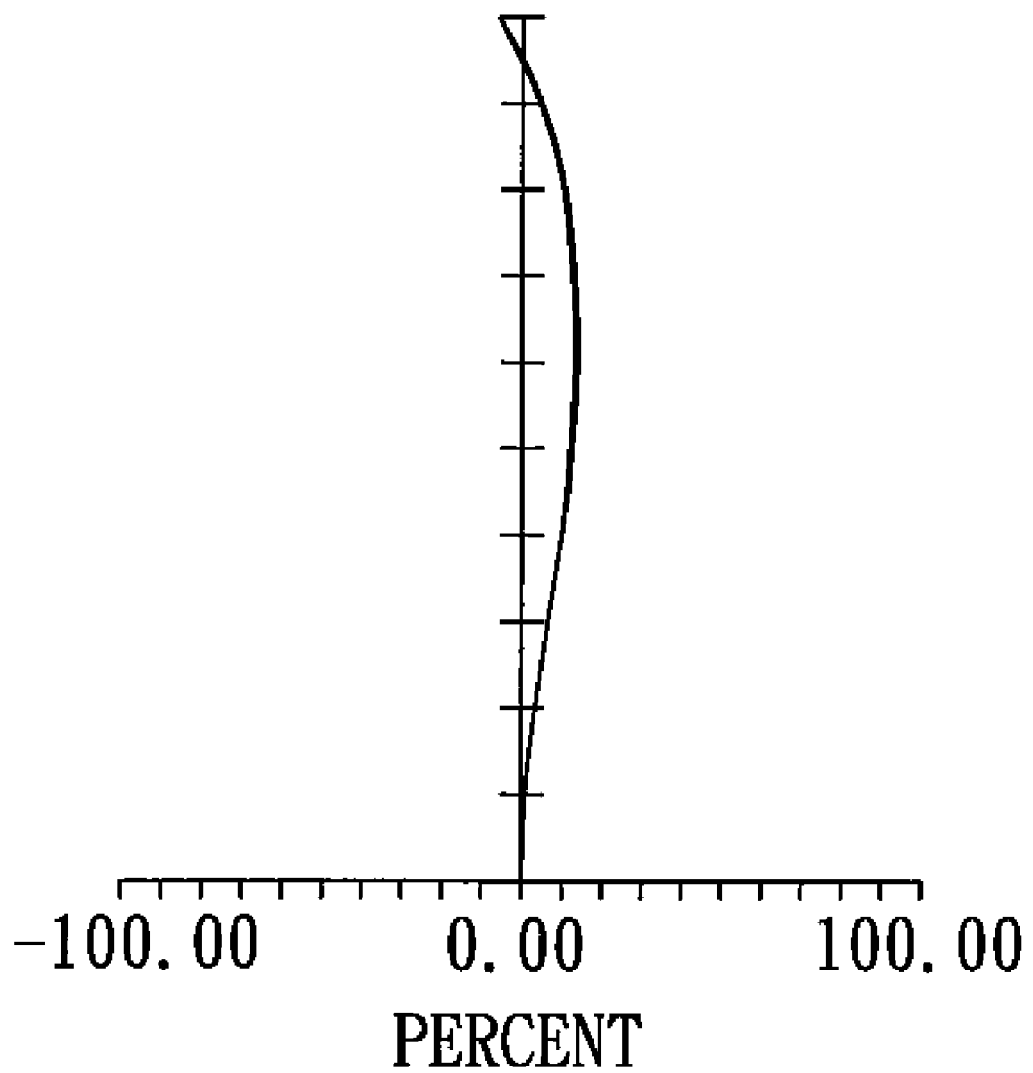

In the embodiment of FIG. 5A, f is 0.987 mm, F No is 2.8, 2ω is 140 degrees, and the radius of curvature r (unit is mm), distance d (mm) between surfaces, index of refraction nd and reciprocal dispersion vd of the respective surfaces of the wide-angle lens system are shown in table 5A:

|  | r | D | nd | vd |
|---|---|---|---|---|
| S1 | 31.011 | 0.97 | 1.53 | 56.3 |
| S2 | 4.609 | 2.093 |  |  |
| S3 | 46.207 | 0.599 | 1.53 | 56.3 |
| S4 | 1.4464 | 1.128 |  |  |
| S5 | 3.4039 | 3.001 | 1.69 | 22.5 |
| S6 | −19.37 | 0.977 |  |  |
| S7 | ∞ | 0.926 |  |  |
| S8 | 3.6273 | 2.588 | 1.53 | 56.3 |
| S9 | −1.255 | 0.5 |  |  |
| S10 | ∞ | 0.3 | BSC7 |  |
| S11 | ∞ | 0.2 |  |  |
| S12 | ∞ | 0.4 | BSC7 |  |
| S13 | ∞ |  |  |  |

Table 5B shows the aspheric surface coefficients of the respective surfaces, except that the surface S1 of the first lens element 1 is a spherical surface, the surface S2 of the first lens element 1 and the surfaces S3, S4, S5, S6, S8 and S9 of the rest lens elements 2, 3 and 4 are all aspheric. In this embodiment, the lens elements 1, 2, 3, and 4 are made of plastic material, and the IR filter 6 and the glass cover 7 are made of colorless glass (BSC7).

| S2 |  | S3 |  |
|---|---|---|---|
| K | −0.31836 | K | −10571.8 |
| A | 3.8168E−04 | A | −3.4963E−05 |
| B | −3.2659E−05 | B | 5.70299E−05 |
| C | −1.0854E−06 | C | −4.1130E−06 |
| D | −5.8072E−08 | D | 5.94099E−08 |

| S4 |  | S5 |  |
|---|---|---|---|
| K | −2.70782 | K | −0.0414 |
| A | 0.024128 | A | 3,20657E−04 |
| B | −1.1978E−03 | B | −6.3624E−05 |
| C | 1.33296E−04 | C | 1.74657E−05 |
| D | 7.97304E−06 | D | 0.0000 |

| S6 |  | S8 |  |
|---|---|---|---|
| K | 0.0000 | K | −7.50242 |
| A | 3.03904E−03 | A | −7.1587E−03 |
| B | 2.46722E−04 | B | 4.68392E−03 |
| C | −1.1208E−04 | C | −1.1126E−03 |
| D | 0.0000 | D | −1.3618E−04 |

| S9 |  |
|---|---|
| K | −2.56657 |
| A | −1.9412E−02 |
| B | 4.10651E−03 |
| C | 2.15727E−04 |
| D | −1.5421E−04 |

Figure 6A:
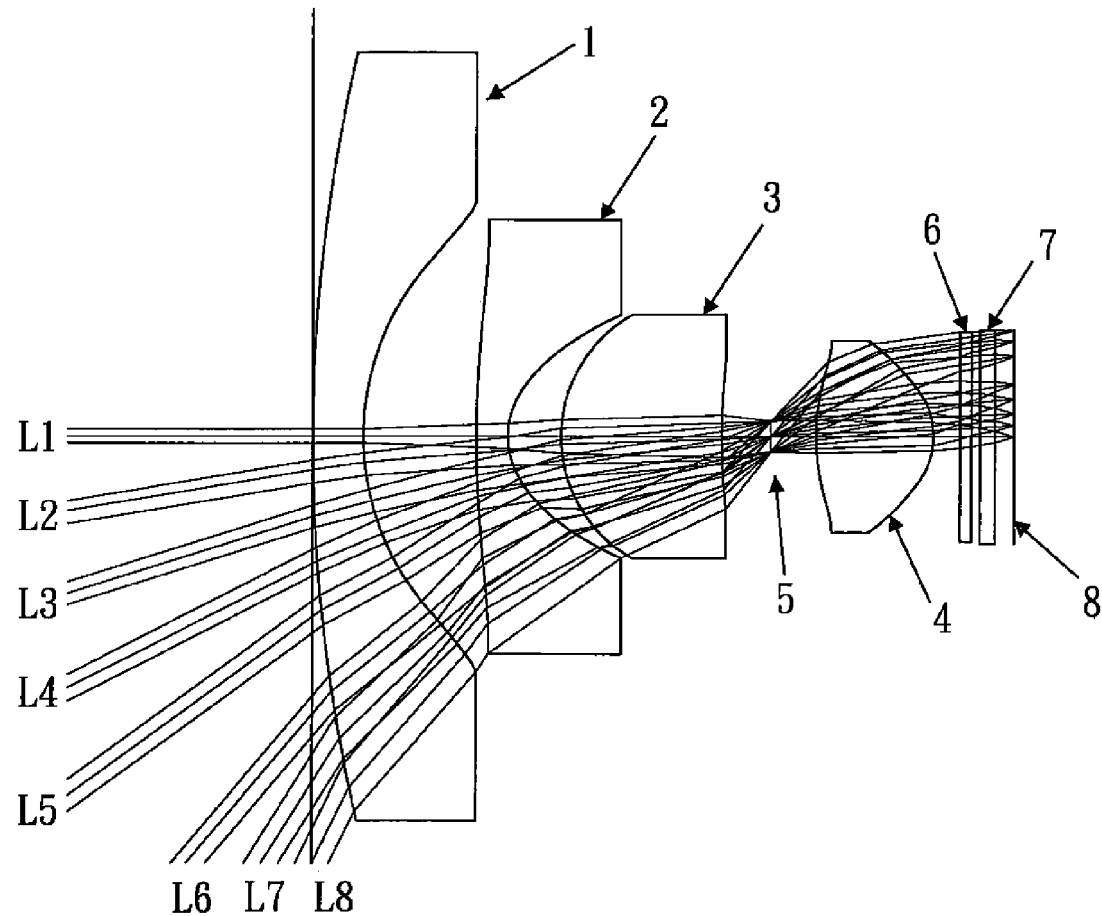
FIG. 6A shows a wide-angle lens system in accordance with a sixth embodiment of the present invention.
Figure 6B:
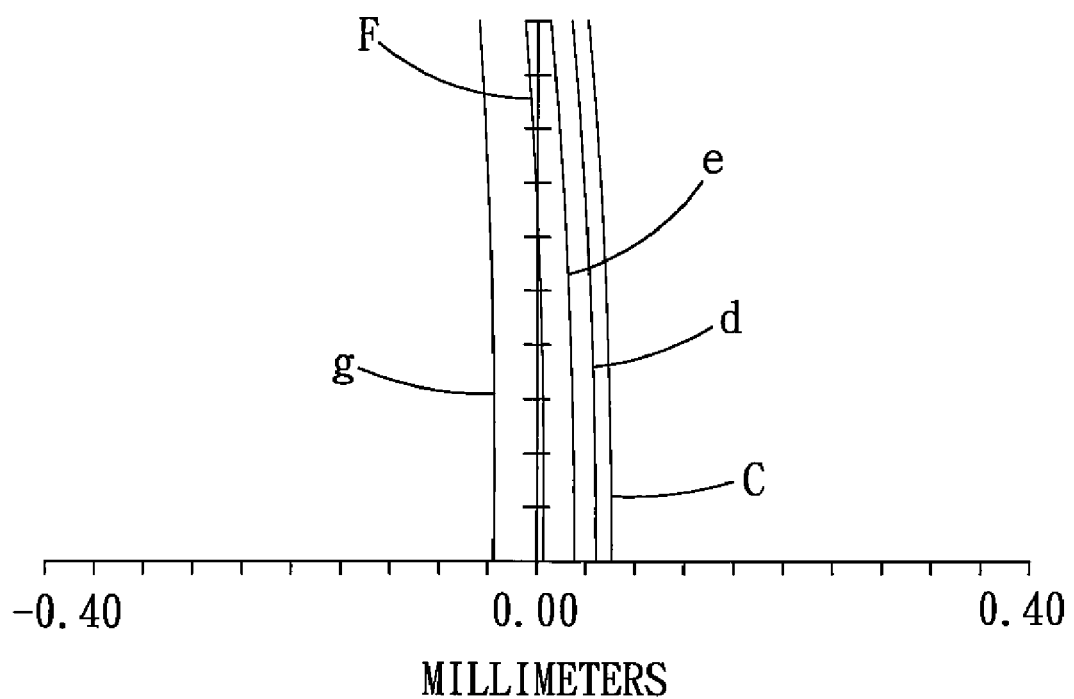
FIG. 6Ba shows the spherical aberration curves in accordance with the sixth embodiment of the present invention.
Figure 6B:
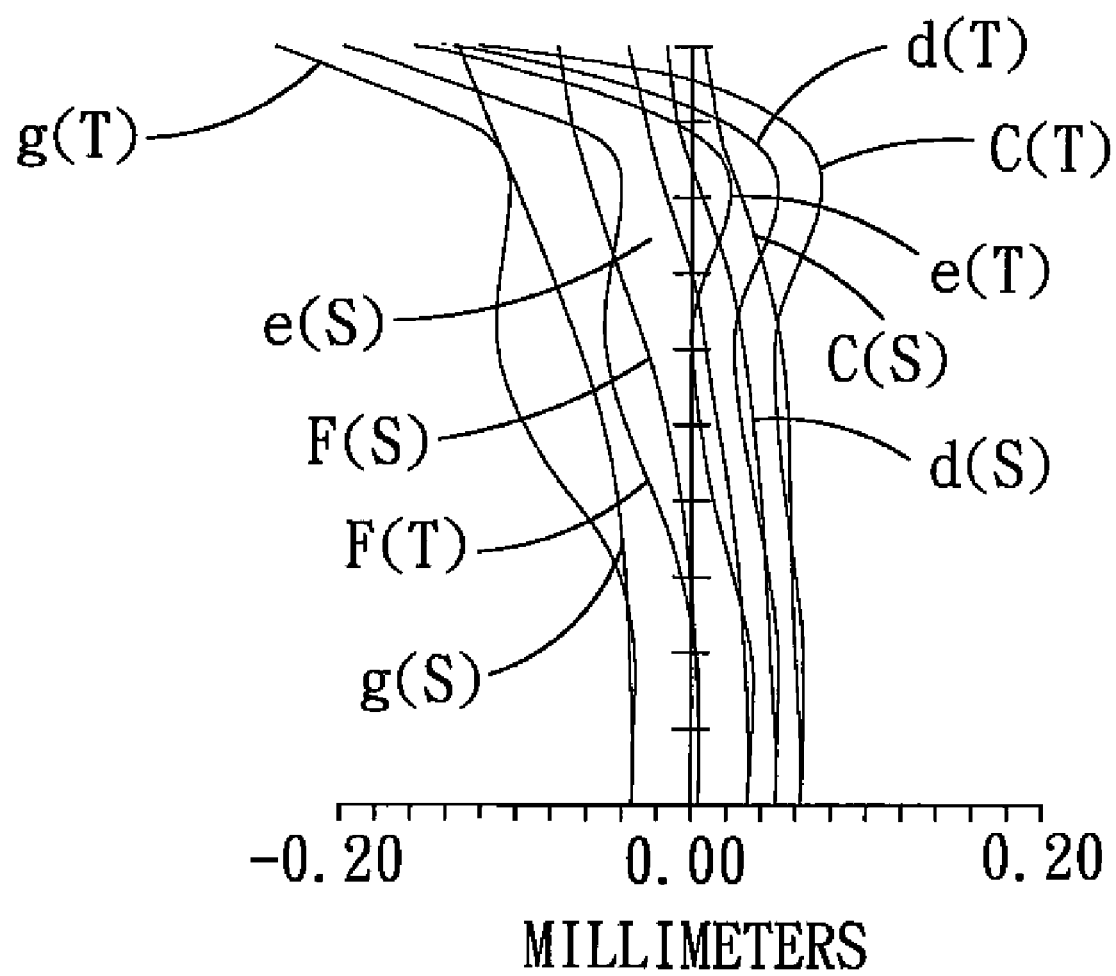
Figure 6B:
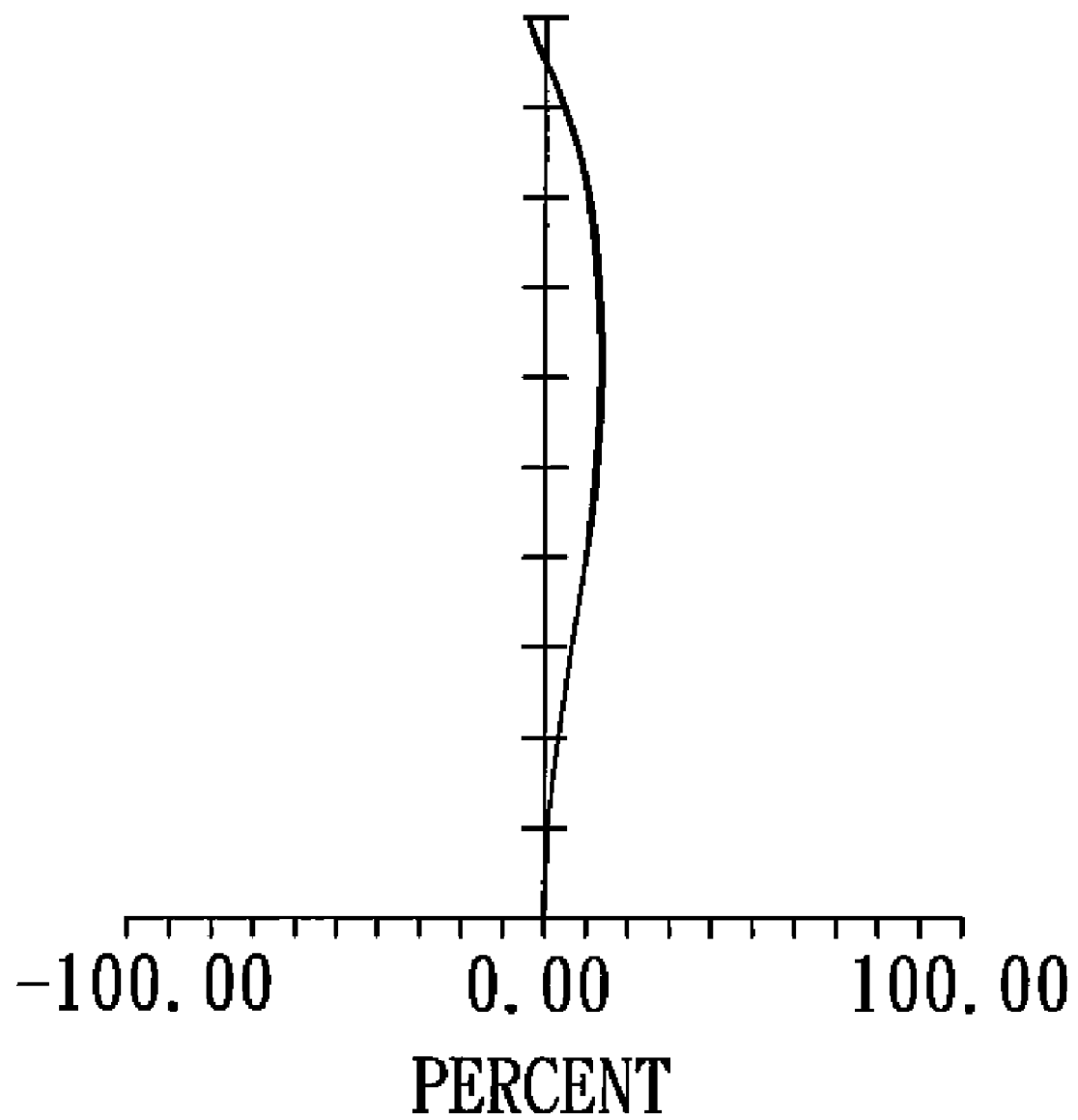

In the embodiment of FIG. 6A, f is 1.003 mm, F No is 2.8, 2ω is 140 degrees, and the radius of curvature r (unit is mm), distance d (mm) between surfaces, index of refraction nd and reciprocal dispersion vd of the respective surfaces of the wide-angle lens system are shown in table 6A:

|     | r      | D     | nd   | vd   |
|-----|--------|-------|------|------|
| S1  | 30.758 | 0.924 | 1.53 | 56.3 |
| S2  | 4.6101 | 2.706 |      |      |
| S3  | 185.22 | 0.601 | 1.53 | 56.3 |
| S4  | 1.5407 | 1.161 |      |      |
| S5  | 3.5803 | 3.002 | 1.72 | 22.1 |
| S6  | −25.46 | 0.977 |      |      |
| S7  | ∞      | 0.922 |      |      |
| S8  | 3.6996 | 2.6   | 1.53 | 56.3 |
| S9  | −1.26  | 0.5   |      |      |
| S10 | ∞      | 0.3   | BSC7 |      |
| S11 | ∞      | 0.2   |      |      |
| S12 | ∞      | 0.4   | BSC7 |      |
| S13 | ∞      |       |      |      |

Table 6B shows the aspheric surface coefficients of the respective surfaces, except that the surface S1 of the first lens element 1 is a spherical surface, the surface S2 of the first lens element 1 and the surfaces S3, S4, S5, S6, S8 and S9 of the rest lens elements 2, 3 and 4 are all aspheric.

| S2 |            | S3 |            |
|----|------------|----|------------|
| K  | −0.3197    | K  | −14138.1   |
| A  | −3.8715E−04| A  | −2.9065E−05|
| B  | −3.3001E−05| B  | 5.72669E−05|
| C  | −1.0993E−08| C  | −4.1075E−06|
| D  | −5.8638E−08| D  | 5.93717E−08|

| S4 |            | S5 |            |
|----|------------|----|------------|
| K  | −2.83595   | K  | −0.02563   |
| A  | 0.023262   | A  | 1.11572E−04|
| B  | −1.3038E−03| B  | 1.8981E−05 |
| C  | 1.19092E−04| C  | 1.85755E−07|
| D  | 6.54210E−06| D  | 0.0000     |

| S6 |            | S8 |            |
|----|------------|----|------------|
| K  | 0.0000     | K  | −7.74769   |
| A  | 2.19456E−03| A  | −7.5497E−03|
| B  | 1.87412E−04| B  | 4.65994E−03|
| C  | −7.5339E−05| C  | −1.0953E−03|
| D  | 0.0000     | D  | −1.2958E−04|

| S9 |            |
|----|------------|
| K  | −2.5039    |
| A  | −1.9654E−02|
| B  | 4.01053E−03|
| C  | 2.07026E−04|
| D  | −1.5236E−04|

In this embodiment, the lens elements 1, 2, 3, and 4 are made of plastic material, and the IR filter 6 and the glass cover 7 are made of colorless glass (BSC7).

Figure 7A:
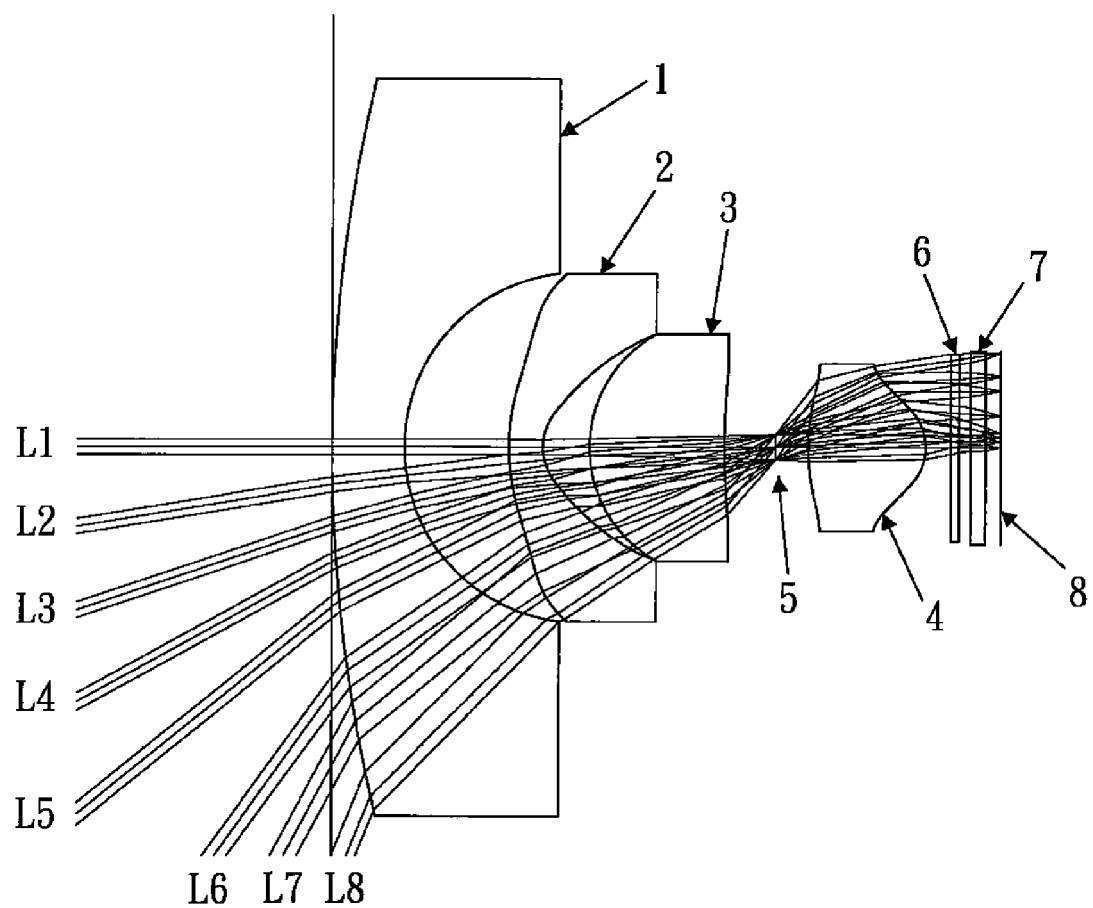
FIG. 7A shows a wide-angle lens system in accordance with a seventh embodiment of the present invention.
Figure 7B:
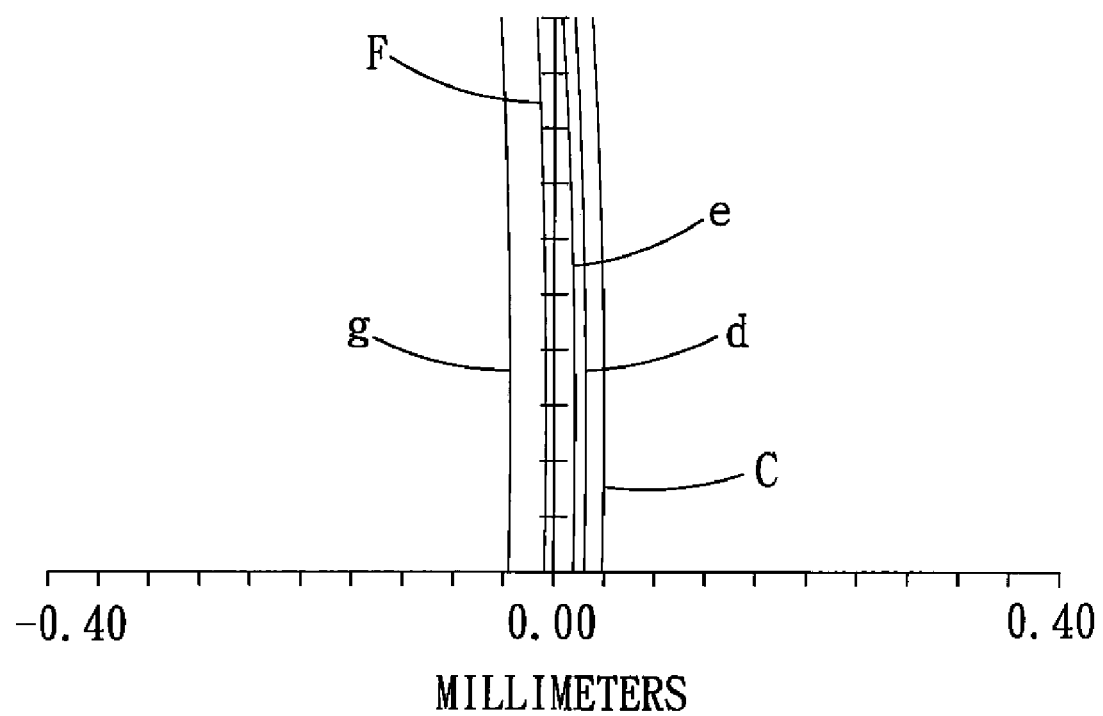
FIG. 7Ba shows the spherical aberration curves in accordance with the seventh embodiment of the present invention.
Figure 7B:
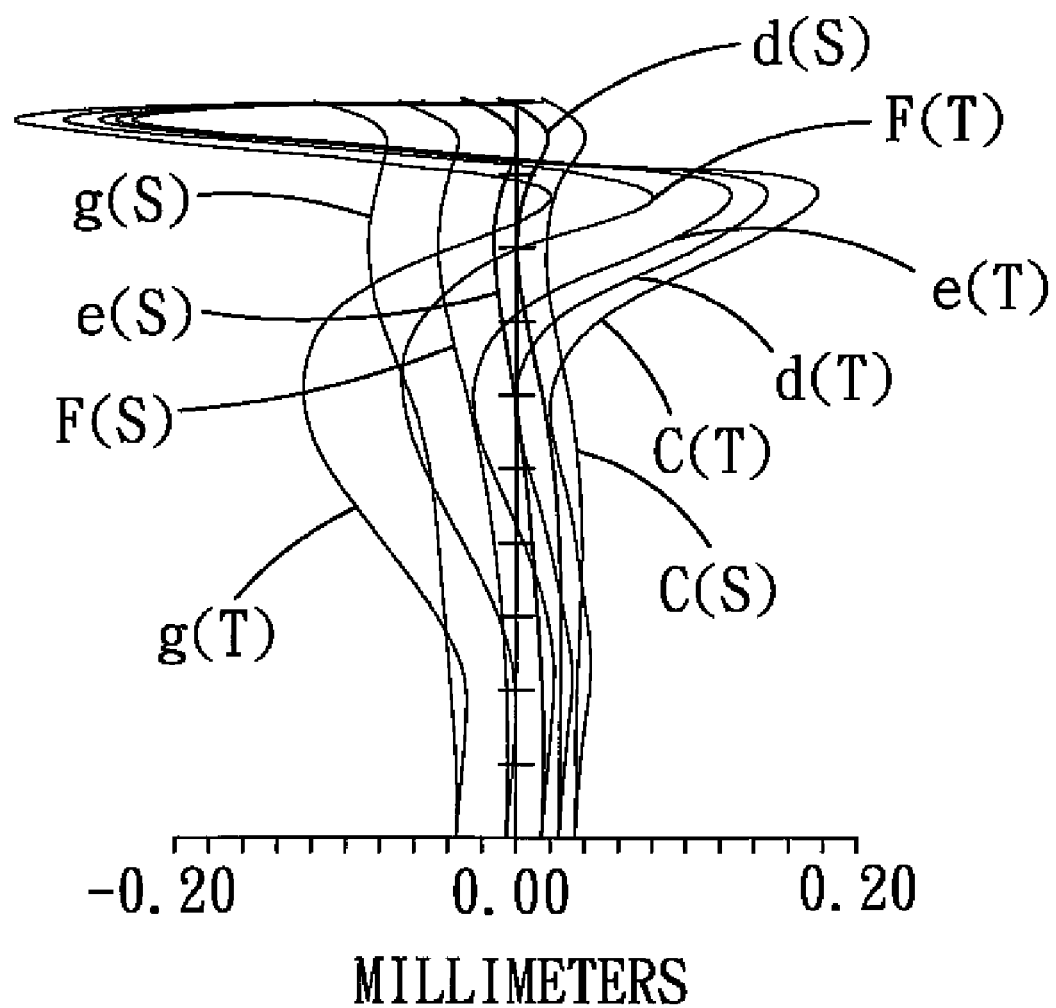
Figure 7B:
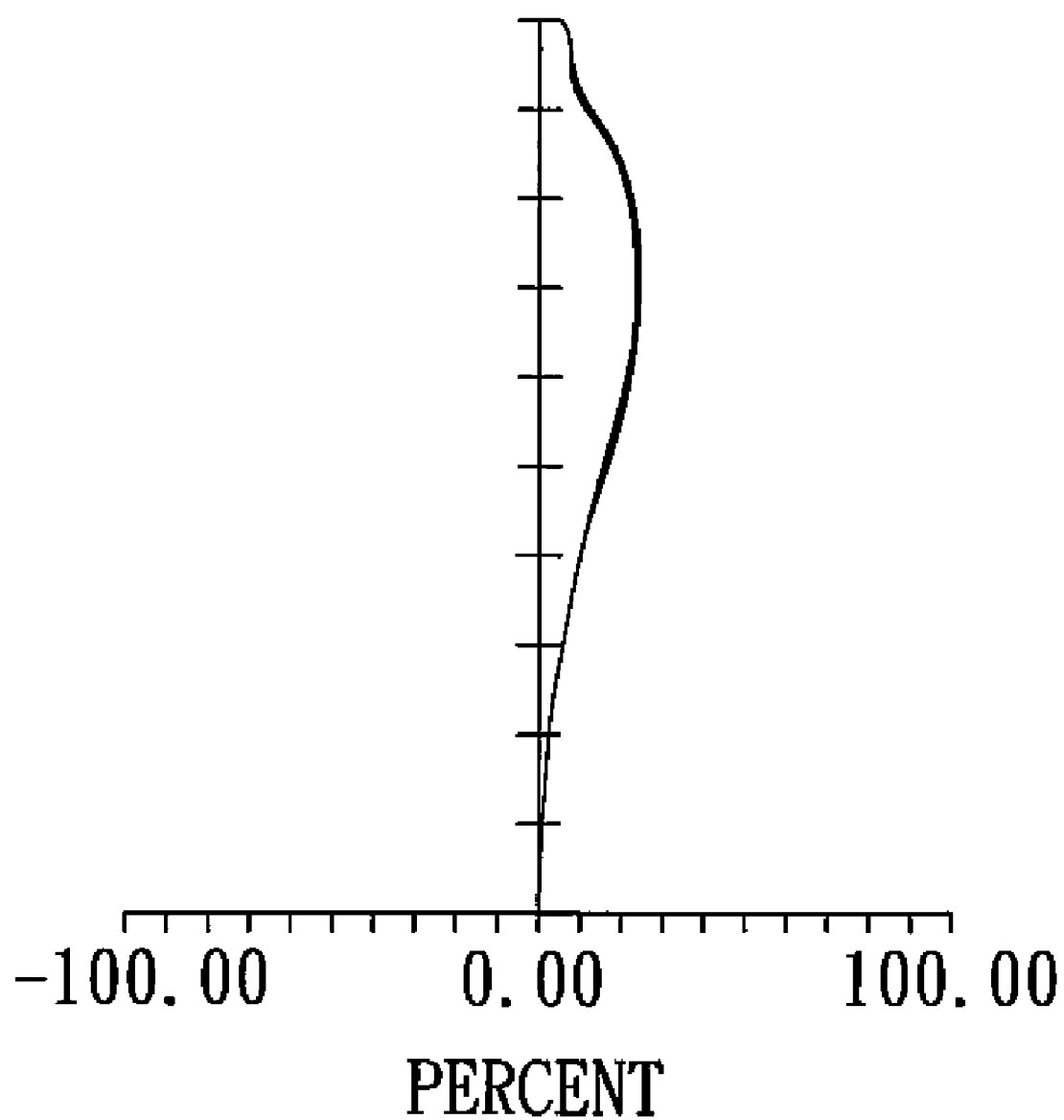

In the embodiment of FIG. 7A, f is 0.819 mm, F No is 2.8, 2ω is 140 degrees, and the radius of curvature r (unit is mm), distance d (mm) between surfaces, index of refraction nd and reciprocal dispersion vd of the respective surfaces of the wide-angle lens system are shown in table 7A:

|     | r       | d     | nd   | vd   |
|-----|---------|-------|------|------|
| S1  | 38.075  | 1.658 | BSC7 |      |
| S2  | 4.1516  | 2.481 |      |      |
| S3  | 3.8988  | 0.703 | 1.53 | 56.3 |
| S4  | 1.0926  | 1.098 |      |      |
| S5  | 3.0394  | 3.316 | 1.63 | 23.4 |
| S6  | −139.7  | 1.076 |      |      |
| S7  | ∞       | 0.768 |      |      |
| S8  | 3.4666  | 2.668 | 1.53 | 56.3 |
| S9  | −1.051  | 0.549 |      |      |
| S10 | ∞       | 0.3   | BSC7 |      |
| S11 | ∞       | 0.22  |      |      |
| S12 | ∞       | 0.4   | BSC7 |      |
| S13 | ∞       |       |      |      |

Table 7B shows the aspheric surface coefficients of the respective surfaces, the surfaces S3, S4, S5, S6, S8 and S9 of the lens elements 2, 3 and 4 are all aspheric.

| S3 |            | S4 |            | S5 |            |
|----|------------|----|------------|----|------------|
| K  | −26.1724   | K  | −2.30334   | K  | 0.068542   |
| A  | −4.1612E−04| A  | 0.025581   | A  | 2.20443E−03|
| B  | 1.9828E−04 | B  | −2.5630E−03| B  | −1.4690E−04|
| C  | −1.0493E−05| C  | 8.76466E−05| C  | −1.3458E−05|
| D  | 5.6127E−07 | D  | 2.3923E−05 | D  | 0.0000     |

| S6 |            | S8 |            | S9 |            |
|----|------------|----|------------|----|------------|
| K  | 0.0000     | K  | −23.5699   | K  | −2.22357   |
| A  | 9.60776E−03| A  | 1.2804E−02 | A  | −3.0414E−02|
| B  | −2.8160E−04| B  | 1.1178E−03 | B  | 4.7420E−03 |
| C  | −3.1147E−04| C  | −6.9335E−04| C  | 1.25882E−03|
| D  | 0.0000     | D  | −5.2700E−05| D  | −2.6640E−04|

In this embodiment, the lens elements 2, 3, and 4 are made of plastic material, and the first lens element 1, the IR filter 6 and the glass cover 7 are made of colorless glass (BSC7).

It is evident from the above tables that the wide-angle lens system comprises four lens elements 1, 2, 3, and 4, and the first and second lens elements 1 and 2 will adjust the incident angle of the incident light, respectively, and then the light enters the third lens 3. The light passed through the second lens element 2 still has a great negative distortion aberration, astigmatic aberration, and magnification chromatic aberration. Therefore, the effective focal length from the first lens element to the third lens element is f123, when the focal length of the wide-angle lens system is f, they must satisfy the following relation:

$$-15.0 < f_{123}/f < -8.0 \qquad \text{Relation 1}$$

When $f_{123}/f > -8.0$, the negative refractive power of the first and second lens elements will increase and cause excessive compression of the image edge, which needs to be compensated by image processing technology. When $f_{123}/f < -15.0$, to guide the incident light with field of view of 140 degrees, the outer diameter of the first lens element must increase accordingly, thus increasing the difficulty of miniaturization.

When the focal length of the fourth lens element is $f_4$, the following relation should be satisfied:

$$-6.5 < f_{123}/f_4 < -3.0. \qquad \text{Relation 2}$$

When $f_{123}/f_4 > -3.0$, the positive refractive power of the fourth lens element will decrease, the positive and negative distortion aberrations cannot be compensated completely and must be compensated by using imaging processing. When $f_{123}/f_4 < -6.5$, the positive refractive power of the fourth lens element will increase, and it needs an extra lens element to form the image. However, determining the positive refractive power of the third lens 3 based on the relation 1 can solve this problem.

The radius of curvature of the object-side surface of the third lens element is r5, the radius of curvature of the image-side surface of the third lens element is r6, and they satisfy the relation:

$$0.6 < (r6+r5)/(r6-r5) < 1.0 \quad \text{Relation 3}$$

When $(r6+r5)/(r6-r5) > 1.0$, the radius of curvature of the object-side surface will be reduced, although this is helpful in compensating distortion aberration, the astigmatic aberration and coma aberration compensation effect is reduced, which results in a low sharpness of the image. When $(r6+r5)/(r6-r5) < 0.6$, it is unable to obtain the desired effect of distortion aberration compensation.

Since the light will be projected onto the fourth lens element 4 to form an image after passing through the first, second and third lens elements 1, 2, 3, it is apparent that the fourth lens element 4 is the principle lens element of the wide-angle lens system. The following relation can determine the shape of the fourth lens element 4, when the radius of curvature of the object-side surface of the fourth lens element is r8, the radius of curvature of the image-side surface of the fourth lens element is r9, and they satisfy the relation:

$$-0.55 < (r9+r8)/(r9-r8) < -0.45. \quad \text{Relation 4}$$

When $(r9+r8)/(r9-r8) > -0.45$, the spherical aberration compensation will be insufficient. When $(r9+r8)/(r9-r8) < -0.55$, the spherical aberration compensation will be excessive, resulting in a low sharpness at the center of the image.

Therefore, a fourth lens element 4 which satisfies the relation 4 and has two aspheric surfaces can ensure that the center and peripheral edge of the image are clear and intact.

The values of the respective embodiments that satisfy the above relations are shown in table 8:

It is apparent that even if the field of view of the wide-angle lens system is as high as 140 degrees, the extreme distortion of the image edge can be prevented with only four lens elements, and the image has a high sharpness. Therefore, it is very suitable for use in the monitor and vehicle-related lens system.

While we have shown and described various embodiments in accordance with the present invention, it is clear to those skilled in the art that further embodiments may be made without departing from the scope of the present invention.

What is claimed is:

1. A wide-angle lens system comprising: a first lens element, a second lens element, a third lens element, a fourth lens element, and an aperture stop; characterized in that:
   the first lens element, the second lens element, the third lens element, the aperture and the fourth lens element are arranged sequentially from the object side to the image side, the first and second lens elements are negative meniscus lens elements with an object-side convex surface, both of the third and fourth lens elements are biconvex;
   at least four of the surfaces of the first, second and third lens elements are aspheric surfaces, and both surfaces of the fourth lens element are aspheric.

2. The wide-angle lens system as claimed in claim 1, wherein an effective focal length from the first lens element to the third lens element is $f_{123}$, a focal length of the wide-angle lens system is f, and they satisfy the relation: $-15.0 < f_{123}/f < -8.0$.

3. The wide-angle lens system as claimed in claim 1, wherein an effective focal length from the first lens element to the third lens element is $f_{123}$, a focal length of the fourth lens element is $f_4$, and they satisfy the relation: $-6.5 < f_{123}/f_4 < -3.0$.

4. The wide-angle lens system as claimed in claim 1, wherein an effective focal length from the first lens element to the third lens element is $f_{123}$, a focal length of the fourth lens element is $f_4$, a focal length of the wide-angle lens system is f, and they satisfy the relations: $-15.0 < f_{123}/f < -8.0$, $-6.5 < f_{123}/f_4 < -3.0$.

5. The wide-angle lens system as claimed in claim 1, wherein a radius of curvature of an object-side surface of the third lens element is r5, a radius of curvature of an image-side surface of the third lens element is r6, and they satisfy the relation:

$$0.6 < (r6+r5)/(r6-r5) < 1.0.$$

6. The wide-angle lens system as claimed in claim 1, wherein a radius of curvature of an object-side surface of the fourth lens element is r8, a radius of curvature of an image-side surface of the fourth lens element is r9, and they satisfy the relation:

$$-0.55 < (r9+r8)/(r9-r8) < -0.45.$$

|  | Embodiment 1 | Embodiment 2 | Embodiment 3 | Embodiment 4 | Embodiment 5 | Embodiment 6 | Embodiment 7 |
|---|---|---|---|---|---|---|---|
| $f_{123}/f$ | −9.42 | −10.7 | −8.25 | −13.7 | −12.2 | −11.6 | −8.47 |
| $f_{123}/f_4$ | −4.14 | −4.77 | −3.66 | −6.28 | −5.53 | −5.31 | −3.60 |
| (r6 + r5)/(r6 − r5) | 0.88 | 0.77 | 0.96 | 0.68 | 0.70 | 0.75 | 0.96 |
| (r9 + r8)/(r9 − r8) | −0.54 | −0.54 | −0.51 | −0.48 | −0.49 | −0.49 | −0.53 |

* * * * *